(12) United States Patent
Nagai et al.

(10) Patent No.: US 8,012,384 B2
(45) Date of Patent: Sep. 6, 2011

(54) POLARIZING PLATE PROTECTIVE FILM AND MANUFACTURING METHOD FOR THE SAME

(75) Inventors: Yasuki Nagai, Hachioji (JP); Kazuto Kiyohara, Kokubunji (JP); Masahiko Yamasaki, Hachioji (JP); Akihiko Takeda, Sagamiko-machi (JP)

(73) Assignee: Konica Minolta Opto, Inc., Tokyo (JP)

( * ) Notice: Subject to any disclaimer, the term of this patent is extended or adjusted under 35 U.S.C. 154(b) by 967 days.

(21) Appl. No.: 11/221,317

(22) Filed: Sep. 7, 2005

(65) Prior Publication Data
US 2006/0060997 A1  Mar. 23, 2006

(30) Foreign Application Priority Data
Sep. 14, 2004  (JP) .................. 2004-266494

(51) Int. Cl.
*B29D 11/00* (2006.01)
*B29D 7/01* (2006.01)
(52) U.S. Cl. .................. 264/1.6; 264/1.34; 264/1.7
(58) Field of Classification Search .................. 264/1.1, 264/1.31, 1.34, 1.35, 2.7
See application file for complete search history.

(56) References Cited

U.S. PATENT DOCUMENTS

| | | | | |
|---|---|---|---|---|
| 2,024,246 A | * | 12/1935 | Northrop et al. | 536/77 |
| 2,336,310 A | * | 12/1943 | Spence et al. | 106/170.49 |
| 2,351,866 A | * | 6/1944 | Miller | 264/140 |
| 7,148,942 B2 | * | 12/2006 | Kobayashi et al. | 349/122 |
| 7,182,981 B1 | * | 2/2007 | Tachibana et al. | 428/1.1 |
| 7,635,506 B2 | * | 12/2009 | Takagi | 428/1.33 |
| 2005/0045064 A1 | * | 3/2005 | Oya | 106/170.27 |

FOREIGN PATENT DOCUMENTS

| | | |
|---|---|---|
| JP | 09-241425 A | 9/1997 |
| JP | 11-255959 A | 9/1999 |
| JP | 2000-352620 A | 12/2000 |
| WO | WO-2005/061595 * | 7/2005 |

OTHER PUBLICATIONS

Modern Plastics; Harper, Charles A. Modern Plastics Handbook. (pp. 7.71-7.73). McGraw-Hill. Online version available at: http://knovel.com/web/portal/browse/display?_EXT_KNOVEL_DISPLAY_bookid=1008&VerticalID=0.*

* cited by examiner

*Primary Examiner* — Yogendra N Gupta
*Assistant Examiner* — Robert J Grun
(74) *Attorney, Agent, or Firm* — Holtz, Holtz, Goodman & Chick, PC

(57) ABSTRACT

A method for manufacturing a polarizing plate protective film including the steps of: 1) mixing a cellulose ester resin and an organic additive to obtain a mixing composition, 2) placing the mixing composition in a mold to obtain an integral molding, and 3) heating to melt the integral molding so as to form the polarizing plate protective film, wherein the integral molding has a size of 1 mm×1 mm×1 mm to 20 mm×20 mm×20 mm, and the cellulose ester resin is contained in the integral molding in a state of particles.

9 Claims, 2 Drawing Sheets

PLASTICIZER ○   CELLULOSE ESTER RESIN ◯

100 μm

200 μm

— CELLULOSE ESTER RESIN
— PLASTICIZER 0.5 μm

20 μm

400 μm

100 μm

POLARIZING PLATE PROTECTIVE FILM AND MANUFACTURING METHOD FOR THE SAME

This application is based on Japanese Patent Application No. 2004-266494 filed on Sep. 14, 2004, in Japanese Patent Office, the entire content of which is hereby incorporated by reference.

FIELD OF THE INVENTION

This invention relates to a polarizing plate protective film and a method for manufacturing the same.

BACKGROUND OF THE INVENTION

Cellulose ester resins are becoming the mainstay for polarizing plate protective films. This is mainly because cellulose ester resin is excellent in terms of optical and physical properties advantageous for polarizing plate protective film. However, the common method for manufacturing the film is generally a film casting method which uses a halogenated organic solvent. Recently, halogenated solvent is being restricted in view of environmental considerations and not personal safety. Also, in addition to use in manufacturing processes, regardless of concerted efforts to remove all the halogenated organic solvent in subsequent steps, there is always some residue. This residual solvent is problematic in that it reduces the durability of the manufactured product.

Meanwhile, a melt casting method has been proposed as a method for manufacturing cellulose ester film that does not use a halogenated organic solvent (please refer to Patent Document 1 for an example). The melt casting method is one method of molding a film by extruding the cellulose ester film while performing thermal melting. Because cellulose ester resin is, generally speaking, a material that tends to deteriorate due to heat or mechanical stress, deterioration of the cellulose ester occurs during this thermal melting process, and it is thus difficult to obtain a film that exhibits sufficient mechanical strength. The device used for the thermal melting extrusion process is generally a uniaxial extruder or a biaxial extruder. A biaxial extruder is a device in which extrusion is performed while applying mechanical stress by rotating 2 shafts. The mixing and dispersion properties for the additives is better via a biaxial extruder in terms of application of mechanical stress, which however is disadvantageous in terms of deterioration of the cellulose ester film. A uniaxial extruder in which mechanical stress is comparatively less is more advantageous with respect to deterioration of the cellulose ester film, but because extrusion is performed using the rotational force of one shaft, the mixing and dispersion properties for the additives deteriorate when compared to a biaxial extruder.

Methods for manufacturing a cellulose ester film in which a uniaxial extruder is used and in which mixing and dispersion properties for the additives are still excellent have been proposed (see for example Patent Documents 2 and 3). These methods results in pellets by heating and melting the cellulose resin ester and the additives at 200° C. or more in a biaxial extruder and then preparing a film by re-melting in a uniaxial extruder. In cases where these methods are used, deterioration of the cellulose ester resin accelerates due to the mechanical stress when the cellulose ester resin is subjected to double heating and then being pelletized in the biaxial extruder. When deterioration of the cellulose ester resin is excessive, the molecular weight as well as the mechanical strength decreases. This poses a problem not only in terms of product quality, but also in terms of recycling of the waste materials which are generated during production.

[Patent Document 1] Unexamined Japanese Patent Application Publication No. (hereinafter, referred to as JP-A) 2000-352620
[Patent Document 2] JP-A 9-241425
[Patent Document 3] JP-A 11-255959

SUMMARY OF THE INVENTION

This invention was conceived in view of the above-cited problems, the object of which is to suppress deterioration of the cellulose ester resin, and improve the mixing and dispersion properties for the additives via a method to obtain a cellulose ester film to protect polarizing plates using a thermal melting method.

BRIEF DESCRIPTION OF THE DRAWINGS

FIGS. 1(A)-1(D) show a jig for manufacturing a molding.
FIG. 1(A) is a top view of the above jig as a square frame-shaped stainless steel spacer.
FIG. 1(B) is a top view of a stainless steel plate.
FIG. 1(C) is a cross-sectional view taken on line 1(C)-1(C) in FIG. 1(A).
FIG. 1(D) is a cross-sectional view taken on line 1(D)-1(D) in FIG. 1(B).
FIG. 1(F-1) is a top view of the die cut molding.
FIG. 1(F-2) is a perspective view of the same molding.
FIGS. 2(A)-2(F) show pattern diagrams of cross-sectional view of TEM observation of the molding wherein
FIG. 2(A) shows Examples 1, 6, 10, and 11, and Comparative Examples 1 and 2;
FIG. 2(B) shows Example 2;
FIG. 2(C) shows Examples 4 and 5;
FIG. 2(D) shows Examples 3, 13 and 14;
FIG. 2(E) shows Example 8;
FIG. 2(A), FIG. 2(B), FIG. 2(D) and FIG. 2(E): Large elliptical particles are cellulose ester resin particles, and small particles around the resin particles are plasticizer particles.
Pattern diagram shown in FIG. 2(C): Needle bar-like particles are plasticizer particles, and the background is cellulose ester resin.
Pattern diagram shown in FIG. 2(F): Large elliptical particles are plasticizer particles, while small elliptical particle around the plasticizer are cellulose ester resin particles.
Distinction of the observed particles are conformed whether P (being phosphor) which is attributable to the plasticizer is detected from EDX analysis.
The above object is achieved via the following configurations.

Figure 1:
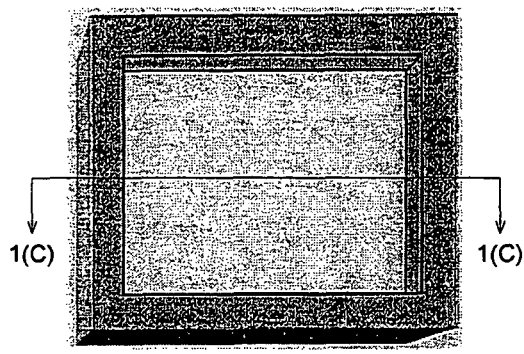
FIGS. 1(E-1) and 1(E-2) are cross-sectional views of combined FIGS. 1(C) and 1(D).
Figure 1:
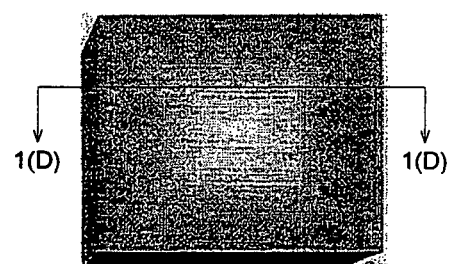
Figure 1:
Figure 1:
Figure 1:
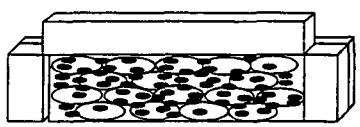
Figure 1:
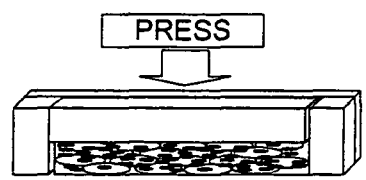
Figure 1:
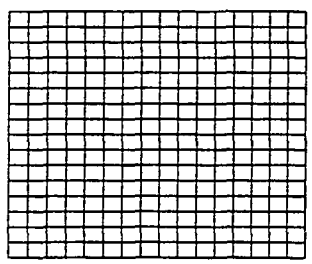
Figure 1:
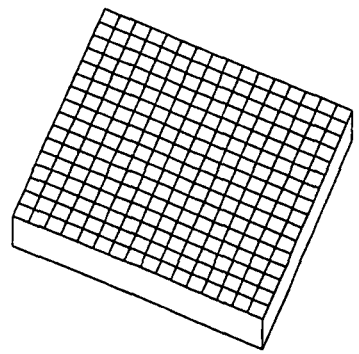
Figure 2:
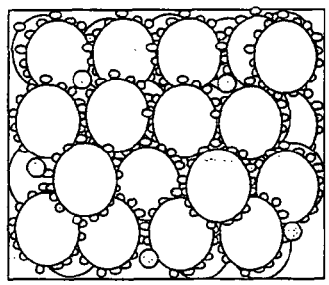
FIG. 2 (F) shows Example 12.
Pattern diagrams shown in Fig.
Figure 2:
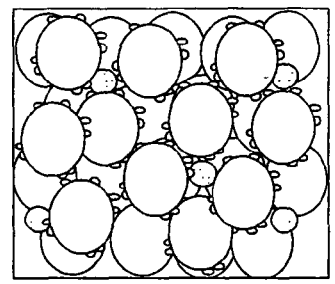
Figure 2:
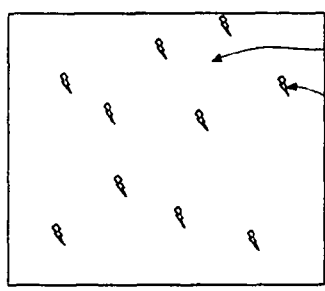
Figure 2:
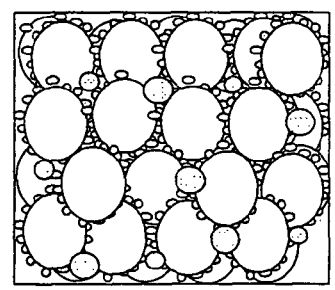
Figure 2:
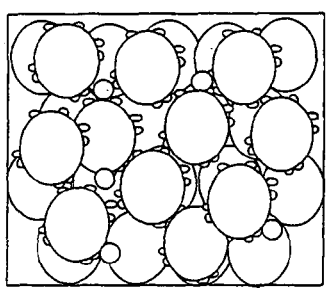
Figure 2:
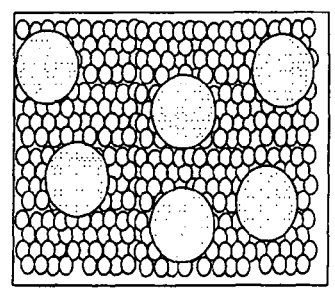

(Item 1)
A method for manufacturing a polarizing plate protective film comprising the steps of:
1) mixing a cellulose ester resin and an organic additive to obtain a mixing composition,
2) placing the mixing composition into a mold to obtain an integral molding, and
3) heating to melt the integral molding so as to form the polarizing plate protective film,
wherein the integral molding has a size of 1 mm×1 mm×1 mm to 20 mm×20 mm×20 mm, and the cellulose ester resin is contained in the integral molding in a state of particles.

(Item 2)

The method for manufacturing the polarizing plate protective film of Item 1, wherein the organic additive in the integral molding is incorporated at a size of not more than 100 pm of a maximum dispersed particle diameter (eDmax), and a weight average particle diameter (cDw50) of the cellulose ester resin being in a state of particles and the maximum dispersed particle diameter (eDmax) having a relationship described below:

$$cDw50 > eDmax$$

(Item 3)

The method for manufacturing the polarizing plate protective film of Item 1 or 2, wherein a weight average particle diameter of the cellulose ester film resin is in the range of 1-200 μm.

(Item 4)

The method for manufacturing the polarizing plate protective film of any one of Items 1-3, wherein a maximum dispersed particle diameter of the organic additive in the polarizing plate protective film is not greater than 0.1 μm.

(Item 5)

The method for manufacturing the polarizing plate protective film of any one of Items 1-4, wherein the cellulose ester resin has the following properties:

When 1 g of the cellulose ester resin is charged into 20 ml of pure water (at an electrical conductivity of not greater than 1 μs/cm and a pH of 6.8) and the resultant is stirred for 1 hour at 25° C. in a nitrogen environment, the resulting solution exhibits a pH of 6-7 and an electrical conductivity of 1-100 μs/cm.

(Item 6)

The method for manufacturing the polarizing plate protective film of any one of Items 1-5, wherein a volume specific resistance of the cellulose ester resin is $10^{11}$-$10^{15}$ Ω/cm.

(Item 7)

The method for manufacturing the polarizing plate protective film of any one of Items 1-6, wherein a molecular weight retention ratio (Mwr (%)) is 85 to 100%, Mwr being defined as (Mwf/Mwt)×100, provided that Mwt is a weight average molecular weight of the integral molding, and Mwf is a weight average molecular weight of the film obtained from the integral molding.

(Item 8)

A polarizing plate protective film manufactured by the method for manufacturing the polarizing plate protective film of any one of Items 1-7.

Effects of the Invention

This invention makes it possible to suppress deterioration of the cellulose ester resin, and improve the mixing and dispersion properties for the additives in the method for obtaining a cellulose ester film for protecting a polarizing plate using a thermal melting method.

PREFERRED EMBODIMENTS OF THIS INVENTION

The following is a detailed description of the preferred embodiments of this invention, but this invention is not limited to these embodiments. Here, simply described as "preferable" means that "preferable for the purpose of this invention".

The polarizing plate protective film of this invention is characterized by the fact that the cellulose ester film is formed by melt extrusion.

Melt extrusion in this invention is defined as melting by heating to a temperature where the cellulose ester becomes fluid without using a solvent, and then the fluid cellulose ester is cast to thereby perform melt casting. The method for performing thermal melt casting, when described in further detail, can be divided into a melt extrusion molding method, a press molding method, an inflation method, an irradiation molding method, a blow molding method, an extrusion molding method and the like. Of these, the melt extrusion method is excellent for obtaining an optical film with excellent productive efficiency. The method for manufacturing melt film of this invention includes as the melt casting method of film formation, the method in which the materials comprising the film are heated and when a fluid state is reached, the fluid is extruded on a drum or an endless belt to thereby form a film.

(Cellulose Ester)

The cellulose ester resin of this invention is a single or mixed acid ester of cellulose which has a cellulose ester structure and includes at least one of a fatty acid acyl group and a substituted or unsubstituted aromatic acyl group.

The following are examples of the useful cellulose ester which meet the objective of this invention, but the cellulose ester is not limited to these examples.

Examples of the benzene ring substituent group when the aromatic ring in the aromatic acyl group is a benzene ring include, a halogen atom, cyano, an alkyl group, an alkoxy group, and aryl group, an aryloxy group, an acyl group, a carbonamide group, a sulfonamide group, a ureido group, an aralkyl group, nitro, an alkoxy carbonyl group, an aryloxy carbonyl group, aralkyoxy carbonyl group, carbamoyl group, a sulfamoyl group, an acyloxy group, an alkenyl group, alkinyl group, an alkyl sulfonyl group, an aryl sulfonyl group, an alkyloxy sulfonyl group, an aryloxy sulfonyl group, alkyl sulfonyloxy group, and an aryloxy sulfonyl group, —S—R, —NH—CO—OR, —PH—R, —P(—R)$_2$, —PH—O—R, —P(—R)(—O—R), —P(—O—R)$_2$, —PH(=O)—R—P(=O)(—R)$_2$, —PH(=O)—O—R, —P(=O)(—R)(—O—R), —P(=O)(—R)$_2$, —O—PH(=O)—R, —O—P(=O)(—R)$_2$—O—H(=O)—O—R, —O—P(=O)(—R)(—O—R), —O—P(=O)(—O—R)$_2$, —NH—PH(=O)—R, —NH—P(=O)(—R)(—O—R), —NH—P(=O)(—O—R)$_2$, —SiH$_2$—R, —SiH(R)$_2$, —Si(—R)$_3$, —O—SiH$_2$—R, —O—SiH(—R)$_2$ and —O—Si(—R)$_3$. R above is an aliphatic group, an aromatic group, or a heterocyclic group. The number of substituent groups is preferably between 1 and 5, more preferably between 1 and 4 and still more preferably between 1 and 3, and most preferably either 1 or 2. Examples of the substituent group preferably include a halogen atom, cyano, an alkyl group, an alkoxy group, an aryl group, an aryloxy group, an acyl group, a carbonamide group, a sulfonamide group, and a ureido group, and more preferably, a halogen atom, cyano, an alkyl group, an alkoxy group, an aryloxy group, an acyl group, and a carbonamide group, and still more preferably, a halogen atom, cyano, an alkyl group, an alkoxy group, and an aryloxy group, and most preferably, a halogen atom, an alkyl group, and an alkoxy group.

Examples of the halogen atom include a fluorine atom, a chlorine atom, a bromine atom, and an iodine atom. The alkyl group may have ring structure or a branched structure. The number of carbon atoms in the alkyl group is preferably 1-20, more preferably 1-12, still more preferably 1-6, and most preferably 1-4. Examples of the alkyl group include methyl, ethyl, propyl, isopropyl, butyl, t-butyl, hexyl, cyclohexyl, octyl and 2-ethyl hexyl. The alkoxy group may have ring structure or a branched structure. The number of carbon atoms in the alkoxy group is preferably 1-20, more preferably 1-12, still more preferably 1-6, and most preferably 1-4. The alkoxy group may be further substituted by another alkoxy group. Examples of the alkoxy group include a methoxy, ethoxy, 2-methoxy ethoxy, 2-methoxy-2-ethoxy ethoxy, butyloxy, hexyl oxy and octyloxy.

The number of carbon atoms in the aryl group is preferably 6-20, and more preferably 6-12. Examples of the aryl group include phenyl and naphtyl. The number of carbon atoms in the aryloxy group is preferably 6-20, and more preferably 6-12. Examples of the aryloxy group include phenoxy and naphtoxy. The number of carbon atoms in the acyl group is preferably 1-20, and more preferably 1-12. Examples of the acyl group include hormyl, acetyl, and benzoyl. The number of carbon atoms in the carbonamide group is preferably 1-20, and more-preferably 1-12. Examples of the carbonamide include acetoamide and benzamide. The number of carbon atoms in the sulfonamide group is preferably 1-20, and more preferably 1-12. Examples of the sulfonamide group include methane sulfonamide, benzene sulfonamide, and p-toluene sulfonamide. The number of carbon atoms in the ureido group is preferably 1-20, and more preferably 1-12. Examples of the ureido group include (unsubstituted) ureido.

The number of carbon atoms in the aralkyl group is preferably 7-20, and more preferably 7-12. Examples of the aralkyl group include benzyl, phenethyl, and naphtyl methyl. The number of carbon atoms in the alkoxycarbonyl group is preferably 1-20, and more preferably 2-12. Examples of the alkoxycarbonyl group includes methoxy carbonyl. The number of carbon atoms in the aryloxy carbonyl group is preferably 7-20, and more preferably 7-12. Examples of the aryloxy carbonyl group include phenoxy carbonyl. The number of carbon atoms in the aralkyloxycarbonyl is preferably 8-20, and more preferably 8-12. Examples of the aralkyoxycarbonyl group include benzyloxycarbonyl. The number of carbon atoms in the carbamoyl group is preferably 1-20, and more preferably 1-12. Examples of the carbamoyl group include (unsubstituted) carbamoyl and N-methyl carbamoyl. The number of carbon atoms in the sulfamoyl group is preferably no greater than 20, and more preferably no greater than 12. Examples of the sulfamoyl group include (unsubstituted) sulfamoyl and N-methyl sulfamoyl. The number of carbon atoms in the acyloxy group is preferably 1-20, and more preferably 2-12. Examples of the acyloxy group include acetoxy and benzoyloxy.

The number of carbon atoms in the alkenyl group is preferably 2-20, and more preferably 2-12. Examples of the alkenyl group include vinyl, aryl and isopropenyl. The number of carbon atoms in the alkinyl group is preferably 2-20, and more preferably 2-12. Examples of the alkinyl group include dienyl. The number of carbon atoms in the alkyl sulfonyl group is preferably 1-20, and more preferably 1-12. The number of carbon atoms in the aryl sulfonyl group is preferably 6-20, and more preferably 6-12. The number of carbon atoms in the alkyloxy sulfonyl group is preferably 1-20, and more preferably 1-12. The number of carbon atoms in the aryloxy sulfonyl group is preferably 6-20, and more preferably 6-12. The number of carbon atoms in the alkyl sulfonyloxy group is preferably 1-20, and more preferably 1-12. The number of carbon atoms in the aryloxy sulfonyl is preferably 6-20, and more preferably 6-12.

In the cellulose ester of this invention, in the case where the hydrogen atom of the hydroxyl group portion of the cellulose is an fatty acid ester with an aliphatic acyl group, the number of carbon atoms in the aliphatic acyl group is 2-20, and specific examples thereof include acetyl, propionyl, butyryl, isobutyryl, valeryl, pivaroyl, hexanoyl, octanoyl, lauroyl, stearoyl and the like.

The aliphatic acyl group of this invention also refers to one which is further substituted, and examples of the benzene ring substituent group include those given as examples when the aromatic ring in the aromatic acyl group is a benzene ring.

When the esterified substituent group of cellulose ester is an aromatic ring, the number of the substituent groups X which are substituted on the aromatic ring should be 0 or 1-5, preferably 1-3, and 1 or 2 is particularly preferable. In addition, when the number of substituent groups substituted on the aromatic ring is 2 or more, the substituent groups may be the same or different from each other, and they may also bond with each other to form a condensed polycylic compound (such as naphthalene, indene, indan, phenanthrene, quinolene, isoquinolene, chromene, chromane, phthalazine, acridine, indole, indolin and the like).

The structure used in the cellulose ester of the present invention is a structure having a structure selected from at least one of substituted or unsubstituted aliphatic acyl group or substituted or unsubstituted aromatic acyl group, and these may be a single ester or a mixture of acid esters, and two types of cellulose may be mixed and used.

The cellulose ester forming the polarizing plate protective film of this invention is preferably at least one type selected from cellulose acetate, cellulose propionate, cellulose butylate, cellulose acetate propionate, cellulose acetate butyrate, cellulose acetate phthalate and cellulose phthalate.

Of these, the preferable cellulose esters are cellulose acetate, cellulose propionate, cellulose butyrate, cellulose acetate propionate, and cellulose acetate butyrate.

In terms of the degree of substitution for the mixed aliphatic ester, the short chain fatty acid ester of the cellulose acetate propionate, and cellulose acetate butyrate which are most preferable, have an acyl group having 2-4 carbon atoms as the substituent group, and given that the substituent group for the acetyl group is represented by X and the substituent group for the propionyl group or the butyryl group is represented by Y, the cellulose resin includes cellulose esters which simultaneously satisfy both Equation (I) and Equation (II) below.

$$2.6 \leq X+Y \leq 3.0 \qquad \text{Equation (I)}$$

$$0 \leq X \leq 2.5 \qquad \text{Equation (II)}$$

Cellulose acetate propionate is preferably used herein, and of the cellulose acetate propionates, those that satisfy $1.9 \leq X \leq 2.5$ and $0.1 \leq Y \leq 0.9$ are particularly preferable. The portion of the acyl group that is not substituted is usually a hydroxyl group.

These may be synthesized by a known method, and in the cellulose ester used in this invention, the ratio of the weight average molecular weight Mw/number average molecular weight Mn is preferably 1.5-5.5, while 2.0-5.0 is particularly preferable, 2.5-5.0 is more preferable and 3.0-5.0 is even more preferable.

The cellulose which is the raw material for the cellulose ester of this invention may be wood pulp or cotton linter, and the wood pulp may be that of a needle-leaf tree or a broad-leaf tree, but that of the broad leaf tree is more preferable. Cotton linter is preferably used in view of peeling properties at the time of film formation. Cellulose esters made from these substances may be suitably blended or used alone.

For example, the proportion of cellulose ester from cotton linter:cellulose ester from wood pulp (needle-leaf tree):cellulose ester from wood pulp (broad-leaf tree) may be 100:0:0, 90:10:0, 85:15:0, 50:50:0, 20:80:0, 10:90:0, 0:100:0, 0:0: 100, 80:10:10, 85:0:15; and 40:30:30.

To stably obtain the effects of this invention, the cellulose ester resin of this invention is preferably one which when charged into 20 ml of pure water (electrical conductivity of not greater than 1 μs/cm and pH of 6.8), and the resultant is stirred for 1 hour at 25° C. in a nitrogen environment, the pH is 6-7, and the electrical conductivity is 1-100 μs/cm. If the pH is less than 6, there is the possibility that the residual organic acid will promote deterioration of the cellulose during thermal melting, while if the PH is greater than 7 there is the possibility that hydrolysis will be promoted. In addition if the electrical conductivity is greater than 100 μs/cm a comparatively large amount of residual ions will be present and this is thought to be a factor causing deterioration of the cellulose during thermal melting.

It is preferable that the volume specific resistance of the cellulose ester $10^{11}$-$10^{15}$ Ω/cm. Furthermore it is preferable to be $10^{13}$-$10^{15}$ Ω/cm. Because the cellulose ester is highly hygroscopic, it is preferable that it is sufficiently dried and as much water as possible is removed. In addition, it is also preferable that the residual organic acid is removed. If the volume specific resistance of the cellulose ester is less that $10^{11}$ Ω/cm, there is the possibility that the cellulose ester resin will deteriorate during thermal heating due to the effect of the residual organic acid and water. A molding of $10^{15}$ Ω/cm cannot be obtained, but it is thought that a higher volume specific resistance is more advantageous in terms of deterioration.

(Organic Additives)

The polarizing plate protective film of this invention preferably includes organic additives. Examples of the organic additives include plasticizer, an ultraviolet light absorber, an antioxidant, an acid trapping agent, a light stabilizer, a retardation regulator, and a high molecular weight polymer material.

The following is a more detailed description of the additives.

(Plasticizer)

Adding known compounds to the polarizing plate protective film as a plasticizer is preferable in view of improving the quality of the film by improving mechanical properties, providing flexibility, providing resistance to water absorption, decreasing water permeability and the like. In the melt casting method that is performed in this invention, the plasticizer is added in order to reduce the melting temperature of the materials composing the film is so as to be less than the individual glass transition temperature of the cellulose ester used. Also, for the same heating temperature, the viscosity of the materials composing the film including the plasticizer can be reduced to be less than that of the cellulose ester.

In this invention, the melting temperature for the materials composing the film refers to the temperature at which the materials become liquid when the materials are heated.

If the cellulose ester by itself is at a temperature that is less than glass transition temperature, the fluid state for film formation is not exhibited. However, at a temperature higher than the glass transition temperature, the modulus of elasticity or the viscosity is reduced due to absorption of heat, and the fluid state is exhibited. In order to melt the materials composing the film, it is preferable that the plasticizer that is added has a melting point or glass transition temperature that is lower than the glass transition temperature of the cellulose ester in order to fulfil the above-described objective.

Preferable examples of the plasticizer used in this invention include phosphoric acid ester derivatives and carbonic acid ester derivatives. In addition, the polymers obtained by polymerization of an ethylene based unsaturated monomer, an acrylic polymer, and an acrylic polymer having an aromatic ring as a side chain, or an acrylic polymer having a cyclohexyl group as a side chain, which are disclosed in JP-A 2003-12859, and which have weight average molecular weight between 500 and 10,000 are also preferably used.

Preferable examples of the phosphoric acid ester derivative which represent the plasticizer include a phosphoric acid ester based plasticizer, a glycerin ester based plasticizer, a diglycerine ester based plasticizer (fatty acid ester), a polyhydric alcohol ester based plasticizer, a dicarbonic acid ester based plasticizer, a polyhydric carbonic acid based plasticizer, and a polymer plasticizer and the like. Of these the polyhydric alcohol ester based plasticizer, the dicarbonic acid ester based plasticizer, and the polyhydric carbonic acid ester based plasticizer are preferable. Furthermore, the plasticizer may be a liquid or a solid and is preferably colorless in view of the limitations of the components. The plasticizer is preferably one which is stable high temperatures and the temperature at which decomposition begins is preferably not less than 150° C., and more preferably, not less than 200° C. The amount of the plasticizer added is any amount for which there are no adverse effects on optical and mechanical properties and the blending amount is any amount suitably selected in a range which does not compromise the object of this invention, and for 100 parts by weight of the polymer of this invention, it is preferably 0.001-50 parts by weight, more preferably 0.01-30 parts by weight and 0.1-15 parts by weight is particularly preferable.

The plasticizer used in this invention is described in more detail in the following. The specific examples are not limited to those given in the following.

Specific examples of the phosphoric acid ester based plasticizer include phosphoric acid alkyl esters such as triacetyl phosphate, tributyl phosphate and the like, phosphoric acid cycloalkyl esters such as tricyclopentyl phosphate, cyclohexyl phosphate and the like, phosphoric acid aryl esters such as triphenyl phosphate, tricresyl phosphate, cresylphenyl phosphate, octyldiphenyl phosphate, diphenylbiphenyl phosphate, trioctyl phosphate, or tributyl phosphate, trinaphtyl phosphate, triglyceryl phosphate, tris ortho-biphenyl phosphate. The substituent groups for these may be the same or different, and may be further substituted. The substituent groups may be a mix of an alkyl group, a cycloalkyl group and an aryl group, and the substituent groups may be bonded to each other by common bonds.

Examples of the phosphoric acid ester also include alkylene bis (dialkyl phosphates) such as ethylene bis (dimethyl phosphate), butylene bis (diethyl phosphate) and the like, alkylene bis (diaryl phosphates such as ethylene bis (diphenyl phosphate), propylene bis (dinaphtyl phosphate) and the like, arylene bis (dialkyl phosphates) such as phenylene bis (dibutyl phosphate), biphenylene bis (dioctyl phosphate) and the like, arylene bis (diaryl phosphates) such as phenylene bis (diphenyl phosphate), naphtylene bis (ditriyl phosphate) and the like. These substituent groups may be the same or different, and may be further substituted. The substituent groups may be a mix of an alkyl group, a cycloalkyl group and an aryl group, and the substituent groups may be bonded to each other by common bonds.

Furthermore, a part of the structure of the phosphoric acid ester may be a part of the polymer or may be systematically included as a pendant. It may also be introduced into a part of the molecular structure of the additive such as the antioxidant, the oxygen scavenger, the ultraviolet light absorber and the like. Of the compounds listed above, aryl ester phosphates and arylene bis (diaryl phosphates) are preferable, and more specifically, triphenyl phosphate and phenylene bis(diphenyl phosphate) are preferable.

Specific examples of the ethylene glycol ester based plasticizers include ethylene glycol alkyl ester based plasticizers such as ethylene glycol diacetate, ethylene glycol dibutylate and the like, ethylene glycol cycloalkyl ester plasticizers such as ethylene glycol dicyclopropyl carboxylate and ethylene glycol dicyclohexyl carboxylate and the like, and ethylene glycol aryl ester based plasticizers such as ethylene glycol dibenzoate and ethylene glycol 4-methyl benzoate and the like. These alkylate groups, cycloalkylate groups and arylate groups may be same or different and may be further substituted. The substituent groups may be a mix of alkylate groups, cycloalkylate groups and aryl groups, and the substituent groups may be bonded to each other by common bonds. Furthermore, the ethylene glycol portion may be substituted and the ethylene glycol ester part of the structure may be a part of the polymer or may be systematically included as a pendant. It may also be introduced into a part of the molecular structure of the additive such as the antioxidant, the oxygen scavenger the ultraviolet light absorber and the like.

Specific examples of the glycerin ester based plasticizer include glycerin alkyl esters such as triacetin, tributyrin, glycerin diacetate caprylate, glycerin oleate propionate and the like, glycerin cycloalkyl esters such as, glycerin tricyclopropyl carboxylate, glycerin tricyclohexyl carboxylate and the like, glycerin aryl esters such as glycerin tribenzoate, glycerin 4-methyl benzoate and the like, diglycerin alkyl esters such as diglycerin tetraactylate, diglycerin tetrapropionate, diglycerin acetate tricaprylate, diglycerin tetralaurate and the like, diglycerin cycloalkyl esters such as diglycerin tetracyclobutyl carboxylate, diglycerin tetracyclopentyl carboxylate and the like, diglycerin aryl esters such as diglycerin tetrabenzoate, diglycerin 3-methylbenzoate and the like. These alkylate groups, cycloalkyl carboxylate groups and arylate groups may be same or different and may be further substituted. The substituent groups may be a mix of alkylate groups, cycloalkyl carboxylate groups and aryl groups, and the substituent groups may be bonded to each other by common bonds. Furthermore, the glycerin and diglycerin portions may be substituted and the glycerin ester or diglycerin ester part of the structure may be a part of the polymer or may be systematically included as a pendant. It may also be introduced into a part of the molecular structure of the additive such as the antioxidant, the oxygen scavenger the ultraviolet light absorber and the like.

Specific examples of the polyhydric alcohol based plasticizer are given in JP-A 2003-12823 from paragraphs 30-33.

These alkylate groups, cycloalkyl carboxylate groups and arylate groups may be same or different and may be further substituted. The alkylate groups, cycloalky carboxylate groups and arylate groups may be mixed, and the substituent groups may be bonded to each other by common bonds. Furthermore, the polyhydric alcohol portion may be substituted and polyhydric alcohol part of the structure may be a part of the polymer or may be systematically included as a pendant. It may also be introduced into a part of the molecular structure of the additive such as the antioxidant, the oxygen scavenger the ultraviolet light absorber and the like.

Examples of the carbonic acid ester based plasticizer include alkyl dicarbonic acid alkyl ester based plasticizers such as didodecyl moranate (C1), dioctyl adipate (C4), dibutyl cevacate (C8) and the like, alkyl dicarbonic acid cycloalkyl ester based plasticizers such as dicyclopentyl succinate, dicyclohexyl adipate and the like, alkyl dicarboxylic acid aryl ester based plasticizers such as diphenyl succinate, di-4-methyl phenyl glutarate and the like, cycloalkyl dicarbonic acid alkyl ester based plasticizers such as dihexyl 1-4-cyclohexane dicarboxylate, didecyl bicyclo[2.2.1]heptane-2, 3-dicarboxylate and the like, cycloalkyl dicarbonic acid dicycloalkyl ester based plasticizers such as dicyclohexyl-1, 2-cyclobutane dicarboxylate, dicyclopropyl-1,2-cyclohexyl dicarboxylate and the like, cycloalkyl dicarbonic acid aryl ester based plasticizers such as diphenyl 1,1-cyclopropyl dicarboxylate, di 2-naphtyl 1,4 cyclohexane dicarboxylate and the like, aryl dicarbonic acid alkyl ester based plasticizers such as diethyl phthalate, dimethyl phthalate, dioctyl phthalate, dibutyl phthalate, di-2-ethyl hexyl phthalate and the like, aryl dicarbonic acid cycloalkyl ester based plasticizers such as dicyclopropyl phthalate, dicyclohexyl phthalate and the like and aryl carbonic acid aryl ester based plasticizers such as diphenyl phthalate, di-4-methyl phenyl phthalate. These alkoxy groups and cycloalkoxy groups may be the same or different, and may also be substituted and the substitution groups may be further substituted. The alkyl groups and the cycloalkyl groups may be mixed, and the substituent groups may be bonded to each other by common bonds. Furthermore, the aromatic ring of the phthalic acid may be substituted and may be polymer such as a dimer, trimer, tetramer and the like. The phthalic acid ester part of the structure may be a part of the polymer or may be systematically included as a pendant. It may also be introduced into a part of the molecular structure of the additive such as the antioxidant, the oxygen scavenger the ultraviolet light absorber.

Specific examples of the polyhydric carbonic acid ester plasticizers include alkyl polyhydric carbonic acid alkyl ester based plasticizers such as tridodecyl tricarbalate, tributyl-meso-butane 1,2,3,4-tetracarboxylate and the like, alkyl polyhydric carbonic acid cycloalkyl ester based plasticizers such as tricyclohexyl tricarbalate, tricyclopopyl-2-hydroxy-1,2,3-propane tricarboxylate, alkyl polyhydric carbonic acid aryl ester based plasticizers such as triphenyl 2-hydroxyl-1, 2,3-propane tricarboxylate, tetra 3-methyl phenyl tetrahydrofuran-2,3,4,5-tetracarboxylate and the like, cycloalkyl polyhydric carbonic acid alkyl ester based plasticizers such as tetrahexyl-1,2,3,4-cyclobutane tetracarboxylate, tetrabutyl-1,2,3,4-dicyclopentane tetracarboxylate and the like, cycloalkyl polyhydric carbonic acid cycloalkyl ester based plasticizers such as tetracyclopropyl-1,2,3,4-cyclobutane tetracarboxylate, tricyclohexyl-1,3,5-cyclohexyl tricarboxylate and the like, cycloalkyl polyhydric carbonic acid aryl ester based plasticizers such as triphenyl-1,3,5-cyclohexyl tricarboxylate, hexa 4-methyl phenyl-1,2,3,4,5,6-cyclohexyl hexacarboxylate and the like, aryl polyhdric carbonic acid alkyl ester based plasticizers such as tridodecyl benzene-1,2,4-tricarboxylate, tetraoctyl benzene-1,2,4,5-tetracarboxylate and the like, aryl polyhdric carbonic acid cycloalkyl ester based plasticizers such as tricyclopentyl benzene-1,3,5-tricarboxylate, tetracyclohexyl benzene-1,2,3,5-tetracarboxylate and the like, and aryl polyhdric carbonic acid aryl ester based plasticizers such as triphenyl benzene-1,3,5-tetracarboxylate, hexa 4-methylphenyl benzene-1,2,3,4,5,6-hexacarboxylate and the like. These alkoxy groups and cycloalkoxy groups may be the same or different, and may also be substituted and the substitution groups may be further substituted. The alkyl groups and the cycloalkyl groups may be mixed, and the substituent groups may be bonded to each other by common bonds. Furthermore, the aromatic ring of the phthalic acid may be substituted and may be polymer such as a dimer, trimer, tetramer and the like. The phthalic acid ester part of the structure may be a part of the polymer or may be systematically included as a pendant. It may also be introduced into a part of the molecular structure of the additive such as the antioxidant, the oxygen scavenger the ultraviolet light absorber and the like.

Specific examples of the polymer plasticizer include acrylic polymers such as an aliphatic hydrocarbon polymer, an alicyclic hydrocarbon polymer, polyacrylate ether, polymethacrylate and the like, vinyl polymers such as, polyvinyl isobytyl ether, polyN-vinyl and the like, styrene based polymers such as polystyrene, poly 4-hydroxy styrene and the like, polyesters such as polybutylene succinate, polyethylene terephthalate, polyethylene naphthalate and the like, polyethers such as polyethylene oxide, polypropylene oxide and the like, polyamides, polyurethanes, polyurea and the like. The number average molecular weight is preferably about 1,000-500,000 and 5,000-200,000 is particularly preferable. If the number average molecular weight is less than 1,000 there are problems with respect to volatility, while of it exceeds 500,000 the plasticizing properties decrease and the mechanical properties of the cellulose ester derivative composition are adversely affected. The polymer plasticizer may be a homopolymer formed of repeating the same kind of polymer units, or may be a copolymer having a structure in which there is a plurality of repeated units. In addition, 2 or more of the polymers may be used together and other plasticizers, antioxidants, oxygen scavenger, ultraviolet light absorber, smoothing agents, and matting agents may be included.

The amount of these compounds used is preferably, in the case of the plasticizer, is preferably the range between 0.5 weight percent and 50 weight percent of the resin composing the film, and more preferably in the range between 1 weight percent and 30 weight percent, and still more preferably in the range 1 weight percent and 11 weight percent. The amount of the compounds added can be adjusted in view of the above-described objective.

Of the plasticizers listed above, it is generally preferably that volatile components are not formed when thermal melting is performed. Specific examples of the non-volatile phosphoric acid esters are described in Japanese Translation of PCT International Application Publication No. 6-501040, and preferably include arylene bis (diaryl phosphate) esters or trimethyrol propane tribenzoate from among the compounds given as examples, but the examples are not limited thereto. When the volatile component results from thermal decomposition of the plasticizer, if the temperature for decomposition of the plasticizer Td (1.0) is defined as the temperature when a reduction of 1.0 weight percent occurs, it is required that the decomposition temperature is higher than the melt temperature of the film forming material. In order to achieve the above object, the amount of the plasticizer added to the cellulose ester should be more than that of the other material composing the film. This is because the presence of volatile components will have a great effect in causing deterioration in the quality of the film obtained. The thermal decomposition temperature Td (1.0) may be measured by a commercially available differential thermal weight analyzer (TG-DTA).

It is to be noted that this invention extends the range of selection for the above-described plasticizers that are generally considered preferable. That is to say, if the material composing the film is formed into an integral molding, the resin and the additives are adhered, and the contact surface with air (particularly oxygen and water) is reduced. For this reason, melting point of the materials composing the film can be expected to be reduced and the thermal decomposition temperature of the plasticizer is increased when compared to the case where the materials are formed as separate units. In addition, the most preferable embodiment is characterized by performing the casting at the lowest temperature possible in a short period. For example, even if the thermal decomposition temperature of the plasticizer Td (1.0) is lower than the melting temperature of the materials composing the film, if the value of Td (1.0) is in the vicinity of the melting temperature of the materials composing the film to the melting temperature of the materials composing the film −30° C., the effect of deterioration in the film quality, such as mechanical strength is not seen.

(Antioxidant)

The following is a description of the antioxidant of this invention.

Examples of the antioxidant include phenol based antioxidants, phosphorous based antioxidants, sulfur-based surfactants, heat-resistance processing stabilizers, oxygen scavengers and the like. Of these examples, phenol based antioxidants and alkyl substituted phenol based antioxidants in particular are preferable. By blending these antioxidants, reduction coloration of the cast and in mechanical strength due to heat and oxidation at the time of casting can be prevented without reducing transparency and heat resistance properties. These antioxidants may be used singly or in combinations of two or more. The amount for blending is in a suitably selected in a range that does not compromise the object of this invention, but the amount is preferably 0.001-5 parts by weight for 100 parts by weight of the polymer used in the invention, and more preferably 0.01-1 part by weight.

Examples of the antioxidant include known hindered phenol antioxidant compounds such as 2-6-dialkyl phenol derivatives and the like which are described in columns 12-14 of the specification of U.S. Pat. No. 4,839,405. These compounds include those represented by the general formula (1 below.

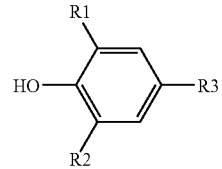

Formula (1)

In the formula, R1, R2 and R3 represent an alkyl group substituent which may or may not be further substituted. Specific examples of the hindered compound include n-octadyl 3-(3,5-di-t-butyl-4-hydroxyphenyl)-propionate, n-octadyl 3-(3,5-di-t-butyl-4-hydroxyphenyl)-acetate, n-octadecyl 3,5-di-t-butyl-4-hydroxybenzoate, n-hexyl 3,5-di-t-butyl-4-hydroxyphenylbenzoate, n-dodecyl 3,5-di-t-butyl-4-hydroxyphenylbenzoate, neo-dodecyl 3-(3,5-di-t-butyl-4-hydroxyphenyl) propionate, dodecyl β-(3,5-di-t-butyl-4-hydroxyphenyl) propionate, ethyl α-(4-hydroxy 3,5-di-t-butylphenyl) isobutyrate, octadecyl α-(4-hydroxy 3,5-di-t-butylphenyl) isobutyrate, octadecyl α-(4-hydroxy 3,5-di-t-butyl-4-hydroxyphenyl) propionate, 2-(n-octylthio) ethyl 3,5-di-t-butyl-4-hydroxy-benzoate, 2-(n-octyl thio) ethyl 3,5-di-t-butyl-4-hydroxy-phenyl acetate, 2-(n-octadecyl thio) ethyl 3,5-di-t-butyl-4-hydroxy-phenyl-acetate, 2-(n-octadecyl thio) ethyl 3,5-di-t-butyl-4-hydroxy-benzoate, 2-(2-hydroxy ethyl thio) ethyl 3,5-di-t-butyl-4-hydroxy-benzoate, diethyl glycol bis (3,5-di-t-butyl-4-hydroxy-phenyl) propionate, 2-(n-octadecyl thio) ethyl 3-(3,5-di-t-butyl-4-hydroxy-phenyl) propionate, stearamide N,N-bis-[ethylene 3-(3,5-di-t-butyl-4-hydroxy-phenyl) propionate], n-butyl imino N,N-bis-[ethylene 3-(3,5-di-t-butyl-4-hydroxy-phenyl) propionate], 2-(2 stearoyloxyethylthio) ethyl 3,5-di-t-butyl-4-hydroxy benzoate, 2-(2 stearoyloxyethylthio) ethyl 7-(3, methyl-5-t-butyl-4-hydroxy-phenyl) heptanoate, 1,2 propylene glycol bis-[3-(3,5-di-t-butyl-4-hydroxy-phenyl) propionate], ethylene glycol bis-[3-(3,5-di-t-butyl-4-hydroxy-phenyl) propionate], neopentyl glycol bis-[3-(3,5-di-t-butyl-4-hydroxy-phenyl) propionate], ethylene glycol bis-(3,5-di-t-butyl-4-hydroxy-phenyl acetate), glycerine-1-n-octadecanoate-2-3-bis-(3,5-di-t-butyl-4-hydroxyphenyl acetate), pentaerythritol-tetrakis [3-(3,5-di-t-butyl-4-hydroxy-phenyl) propionate], 1,1,1-trimethyrol ethane tris [3-(3,5-di-t-butyl-4-hydroxy-phenyl) propionate], sorbitol hexa-[3-(3,5-di-t-butyl-4-hydroxy-phenyl) propionate], 2-hydroxyyethyl 7-(3-methyl-5-t-butyl-4-hydroxy-phenyl) propionate, 2-stearoyloxyethyl 7-(3, methyl-5-t-butyl-4-hydroxy-phenyl) heptanoate, 1,6-n-hexane diole bis [(3',5'-di-t-butyl-4-hydroxy-phenyl) propionate], pentaerythritol-tetrakis (3,5-di-t-butyl-4-hydroxy hydroxinamate). The hindered phenol based antioxidant compounds of the type listed below are commercially available as "Irganox 1076" and Irganox 1010 manufactured by Chiba Specialty Chemicals.

Specific examples of other antioxidants include phosphorous based antioxidants such as trisnonylphenylphosphite, triphenylphosphite, tris (2,4,di-tert-butylphenyl) phosphite and the like, sulfur based antioxidants such as dilauryl-3,3'-thiodipropionate, dimyristyl 3,3' thiodipropionate, distearyl-3,3'-thiodipropionate, pentaerythritol-tetrakis (3-lauryl thiopropionate) and the like, heat resistance process stabilizer such as 2-tert-butyl-6-(3-tert-butyl-2-hydroxy-5-methylbenzyl)-4-methyl phenyl acrylate, 2-[1-(2-hydroxy-3,5-di-tert-pentyl phenyl) ethyl]-4,6 tert pentyl phenyl acrylate and the like, compounds having a pyridine skeleton as part of the structure such as 3,4-di hydro-2H-1-benzopyrane based compounds, 3,3 spirocycloman compounds, 1,1 spiroindan compounds, morpholine, thiomorpholine, thiomorpholine oxide, thiomorpholine dioxide, which are described in Examined Japanese Patent Application Publication No. 08-27508, and oxygen scavengers such as dialkoxybenzene based compounds and the like which are described in JP-A 03-174150. The antioxidant part of the structure may be a part of the polymer or may be systematically included as a pendant. It may also be introduced into a part of the molecular structure of the additive such as the antioxidant, the oxygen scavenger the ultraviolet light absorber and the like.

(Acid Trapping Agent)

The acid trapping agent preferably includes an epoxy compound which is a trapping agent described in the specification of U.S. Pat. No. 4,137,201. The epoxy compounds which are trapping agents include those known in the technological field, and examples include polyglycols derived by condensation such as various diglyceril ethers of various polyglycols, especially those having approximately 8-40 moles of ethylene oxide per mole of polyglycol, diglyceril ethers of glycerol and the like, metal epoxy compounds (such as those used in the past in vinyl chloride polymer compositions and those used together with vinyl chloride polymer compositions, epoxy ether condensation products, diglycidyl ethers of bis phenol A (namely 4,4'-dihydroxy diphenyl dimethyl methane), epoxy unsaturated fatty acid ester (particularly alkyl esters having about 4-2 carbon atoms of fatty acids having 2-22 carbon atoms (such as butyl epoxy stearate) and the like, and include various epoxy long-chain fatty acid triglycerides and the like (such as epoxy plant oils represented by compositions of epoxy soy bean oil and the like and other unsaturated natural plant oils (these are sometimes called epoxy natural glycerides or unsaturated fatty acids and these fatty acids generally have 12-22 carbon atoms). Particularly preferable commercially available epoxy resin compounds EPON 815c which include an epoxy base, and other epoxy ether oligomer condensates such as those represented by the general formula (2).

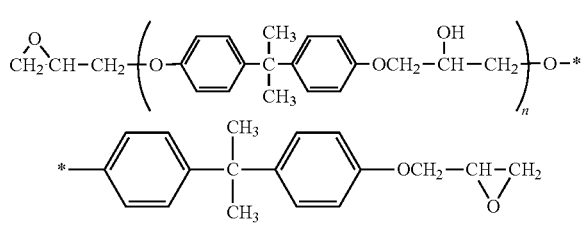

Formula (2)

In the formula, n is equal to 0-12. Other acid trapping agents which can be used include those described in paragraphs 87-105 of JP-A 5-194788.

(Light Stabilizer)

Examples of the light stabilizer include hindered amine light stabilizers (HALS) compounds. These are known compounds and examples include 2,2,6,6-tetraalkyl piperidine compounds and the acid addition salts or the metal salt complexes thereof which are described in columns 5-11 of the specification of U.S. Pat. No. 4,619,956 and columns 3-5 of the specification of U.S. Pat. No. 4,839,405. Examples of these compounds include those represented by the general formula (3) below.

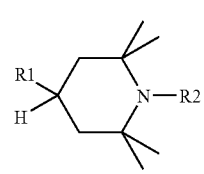

Formula (3)

In the formula, R1 and R2 represent H or a substituent group. Specific examples of the hindered amine light stabilizers include 4-hydroxy 2,2,6,6-tetramethyl piperidine, 1-aryl-4-hydroxy 2,2,6,6-tetramethyl piperidine, 1-benzyl-4-hydroxy 2,2,6,6-tetramethyl piperidine, 1-(4-t-butyl-2-butenyl)-4-hydroxy 2,2,6,6-tetramethyl piperidine, 4-stearoyl oxy 4-hydroxy 2,2,6,6-tetramethyl piperidine, 1-ethyl-4-saliscyloyoxy, 2,2,6,6-tetramethyl piperidine, 4-methacryloyloxy-1,2,2,6,6-pentamethyl piperidine, 1,2,2,6,6-pentamethyl piperidine-4-yl-β(3,5-di-t-butyl-4-hydroxyphenyl)-propionate, 1-benzyl-2,2,6,6-tetramethyl-4-piperidinyl maleinate, (di 2,2,6,6-tetramethyl piperidine-4-yl)-adipate, (di 2,2,6,6-tetramethyl piperidine-4-yl) sepacate, (di 1,2,3,6-tetramethyl 2,6-diethyl-piperidine-4-yl) sepacate, (di-1-aryl-2,2,6,6-tetramethyl-piperidine-4-yl) phthalate, 1-acetyl-2,2,6,6-tetramethyl-piperidine-4-yl acetate, trimellitic acid-tri-(2,2,6,6-tetramethyl-piperidine-4-yl) ester, 1-acryloyl-4-benzyloxy-2,2,6,6-tetramethyl-piperidine, dibutyl-malonic acid (1,2,2,6,6-pentamethyl-piperidine-4-yl)-ester, dibenzyl-malonic acid di-(1,2,3,6-tetramethyl-2-6-diethyl piperidine-4-yl)-ester, dimethyl-bis-2,2,6,6-tetramethyl-piperidine-4-oxy)-silane, tris-(1-propyl-2,2,6,6-tetramethyl-piperidine-4-yl) phosphite, tris-(1-propyl-2,2,6,6-tetramethyl-piperidine-4-yl) phosphate, N-N'-bis-2,2,6,6-tetramethyl-piperidine-4-yl)-hexamethylene 1,6-diamine, N-N'-bis-2,2,6,6-tetramethyl-piperidine-4-yl)-hexamethylene 1,6-diacetamide, 1-acetyl-4-(N-cyclohexyl acetoamide)-2,2,6,6-tetramethyl-piperidine, 4-hexylamino-2,2,6,6-tetramethylpiperidine, N-N'-bis-2,2,6,6-tetramethyl-piperidine-4-yl)-N-N'-dibutyl adipamide, N-N'-bis-2,2,6,6-tetramethyl-piperidine-4-yl)-N-N'-dicyclohexyl-2-hydroxypropylene), N-N'-bis-2,2,6,6-tetramethyl-piperidine-4-yl)-p-xylelene-diamide, 4-bis-2-hydroxyethyl-amino-1,2,2,6,6-pentam-ethyl piperidine, 4-methacrylamide 1,2,2,6,6-pentamethyl piperidine, α-cyano-β-methyl-β-[N-(2,2,6,6-tetramethyl-piperidine-4-yl)]-amino-methyl ester acrylate. Examples of the preferable hindered amine light stabilizers include those represented by HALS 1 and HAL2 below.

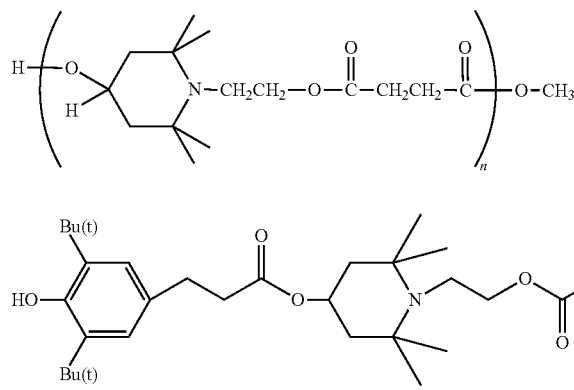

HALS-1)

HALS-2)

These hindered amine light stabilizers may be used singly or in combinations of 2 or more, and they may also be used with plasticizers, acid scavenger, ultraviolet light absorbers, or introduced into a part of the molecular structure of the additive. The amount for blending is suitably selected in a range which does not compromise the object of this invention, and for 100 parts by weight of the polymer of this invention, it is preferably 0.01-20 parts by weight, more preferably 0.02-15 parts by weight and 0.05-10 parts by weight is particularly preferable.

(Ultraviolet Light Absorber)

The ultraviolet light absorber preferably has excellent ultraviolet light absorbance for wavelengths not greater than 370 nm in view of preventing deterioration of the ultraviolet light of the polarizing element or the display device, and from the viewpoint of the liquid crystal display, it is preferable that there is little absorbance of visible light which has wavelength of not less than 400 nm. Examples include oxybenzophenone compounds, benzotriazole compounds, salicylic acid ester compounds, benzophenone compounds, cyano acrylate compounds, nickel complex compounds, and the like and benzophenone compounds and benzotriazole compounds which have little coloration are preferable. In addition, the ultraviolet light absorbers described in Unexamined JP-A Nos. 10-182621 and 8-337574, and the high molecular weight ultraviolet light absorbers described in JP-A 6-148430 may also be used.

Specific examples of the benzotriazole based ultraviolet light absorbers include 2-(2'-hydroxy-5' methylphenyl) benzotriazole, 2-(2'-hydroxy 3'-5'-di-tert-butyl phenyl) benzotriazole, 2-(2'-hydroxy 3'-tert-butyl-5'methylphenyl) benzotriazole, 2-(2'-hydroxy 3'-5'-di-tert-butyl phenyl)-5-chlorobenzotriazole, 2-(2'-hydroxy 3'-(3",4",5",6"-tetrahydrophthalimide methyl)-5'methylphenyl) benzotriazole, 2,2-methyl bis 84-(1,1,3,3,-tetramethyl butyl)-6-(2H-benzotriazole-2-yl) phenyl, 2-(2'-hydroxy-3'-tert-butyl-5'-methylphenyl-5-chlorobenzotriazole, 2-(2H-benzotriazole-2-yl)-6-(straight chain or side chain dodecyl)-4-methylphenyl, and mixtures of octyl-3-[3-tert-butyl-4-hydroxy-5-(chloro-2H-benzotriazole-2-yl) phenyl] propionate and 2-ethylhexyl-3-[3-tert-butyl-4-hydroxy-5-(5-chloro-2H-benzotriazole-2-yl) phenyl]propionate. The benzotriazole based ultraviolet light absorber is however, not limited to these examples.

Commercially available TINUVIN 109, TINUVIN 171, and TINUVIN 360, which are manufactured by Chiba Specialty Chemical Co., Ltd. may also be used as the benzotriazole based ultraviolet light absorber.

Examples of the benzophenone based compound include 2,4-hydroxy benzophenone, 2,2'-dihydroxy-4-methoxy benzophenone, 2-hydroxy-4-methoxy-5-sulfobenzophenone, bis (2-methoxy-4-hydroxy-5-benzoyl phenyl methane) and the like, but are not limited thereto.

The amount of the ultraviolet light absorber used in this invention is preferably 0.1-20 weight percent, and more preferably 0.5-10 weight percent, and still more preferably 1-5 weight percent. Two or more of these may be used together.

(Retardation Regulator)

In the polarizing plate protective film of this invention, the orientation film is formed and the liquid crystal layer is provided thereon. The retardation originating from the polarizing plate protective film and the liquid crystal layer are combined and optical compensation capability is thereby imparted, and polarizing plate processing is thereby performed such that the quality of the liquid crystal display is improved. The compounds added for regulating retardation include aromatic compounds having 2 or more aromatic rings which are described in the specification European Patent No. 911,656A2 which can be used as retardation regulators. Two or more of these compounds may be used together. The aromatic ring of these aromatic compounds may include aromatic heterocyclic rings in addition to aromatic hydrocarbon rings. The aromatic heterocyclic ring is preferable and the aromatic heterocyclic ring is generally an unsaturated heterocyclic ring. Of these, 1,3,5-triazine ring is particularly preferable.

(High Molecular Weight Polymer Material)

High molecular weight polymer materials and oligomers other than cellulose ester may be suitably selected and mixed in the polarizing plate protective film of this invention. The abovementioned high molecular weight polymer and oligomer preferably have excellent compatibility with cellulose ester and the transparency when formed as a film is preferably 80% or more, more preferably 90% or more and still more preferably 92% or more. The object of mixing at least more of high molecular weight polymer materials and oligomers other than cellulose ester is also to regulate viscosity during thermal melting and to improve the physical properties of the film after film processing. In this case, the additives other than those described above may be added.

(Matting Agent)

Fine particles such as a matting agent or the like may be added to polarizing plate protective film of this invention in order to impart smoothness, and fine particles of inorganic compounds as well as fine particles of organic compounds may be used. The particles of the matting agent are preferably as fine as possible and examples of the fine particle matting agent include inorganic fine particles such as those of silicon dioxide, titanium dioxide, aluminum oxide, zirconium oxide, calcium carbonate, kaolin, talc, burned calcium silicate, hydrated calcium silicate, aluminum silicate, magnesium silicate, and calcium phosphate or cross-linked fine particles of high molecular weigh polymers. Of these, silicon dioxide is preferable in view of reduced haze in the film. The particles such as the silicon dioxide particles are often surface treated using an organic substance, and this is preferable because it reduces haze in the film.

Examples of the organic compound preferably used in the surface treatment include halogens, alkoxysilanes, silazanes, and siloxanes. Particles having a larger average particle diameter have a greater matting effect, while particles having a smaller average particle diameter have excellent transparency. The secondary particles should have an average primary particle diameter in the range of 0.05-1.0 µm. The secondary particles preferably has an average primary particle diameter in the range of 5-50 nm, and more preferably 7-14 nm. These fine particles are preferable because they create unevenness of 0.01-1.0 µm in the plane of the cellulose ester film. The amount of the fine particles included in the cellulose ester is preferably 0.005-0.3 weight percent of the cellulose ester.

Examples of the silicon dioxide particles include Aerosil 200, 200V, 300, R972, R972V, R974, R202, R812, OX50, or TT600 each produced by Nippon Aerosil Co., Ltd., and of these, Aerosil 200V, R972, R972V, R974, R202, and R812, are preferred. Two or more of these matting agents may be combined and used. In the case where 2 or more matting agents are used, they may be mixed in a suitably selected proportion. In this case, matting agents which have different particle diameter and quality such as Aerosil 200V and R927V may be used in weight proportions in the range from 0.1:99.9-99.9:0.1

The presence of the fine particles used as the matting agent in the film can also serve another purpose of improving the strength of the film. The presence of the fine particles in the film may also improve the orientation of the cellulose ester itself which composes the polarizing plate protective film of this invention.

(Method for Manufacturing the Cast and the Size Thereof)

Examples of the Method for manufacturing the cast include a method of obtaining a tablet-shaped cast by applying pressure and compressing, and a method of obtaining a tablet-shaped cast by applying heat and compressing.

In both of these methods for obtaining a tablet-shaped cast, it is necessary to apply pressure, and examples of the methods include a method in which a flat cast is obtained using a pressing machine or the like and then it is prepared to have a desired size using a method such as cutting, rapping or the like, or a method in which the sample is inserted into a cylindrical casting device, and a piston having substantially the same inner diameter of the cylindrical casting device is inserted and pressing is done to obtain a rod-shaped cast and then it is cut to a desired size.

FIGS. 1(A)-1(D) show an example of the jig for forming the cast used in the example.

A square frame-shaped spacer (5-50 mm thick) made from stainless-steel is placed on a specular stainless steel plate and the obtained cellulose ester resin fine particles including the additives are put into the concave portion formed by the spacer. After the particles are made flat by the blade, a stainless steel plate having a prescribed thickness (10 mm-25 mm) is fit into the square frame-shaped stainless steel spacer (the cavity of the concave portion). Pressure is applied in a pressing machine at room temperature (20-25° C.) and a pressure of $1-4\times10^7$ Pa for a period in the range of 5-15 minutes, and flat cellulose ester resin cast including additives was thereby obtained. The thickness of the jigs such as the spacer can be suitably adjusted in order for the cast to have a desired thickness. Also, the above operations may be performed repeatedly as necessary in order to adjust to the desired thickness.

The obtained flat cast is transferred to a separate stainless steel plate, and a sharp rapper is placed on the plate having a plurality of rectangular boxes on one surface (shown in FIG. 1(F-1)) is placed thereon, and pressure is applied at $1-6\times10^6$ Pa for a period in the range of 1-5 minutes and a square cast having a desired size is thereby obtained.

The method for forming the pellet shaped casting is one in which melt extrusion is performed at a temperature +30° C. or more above the glass transition temperature of the cellulose ester resin in a biaxial extruder to obtain rod-shaped pellets, and then cut to the desired size used the method described above.

The cellulose ester resin is a material which deteriorates remarkably due to heat and thus a method (method for obtained tablet-shaped moldings) in which molding is done at a temperature where deterioration does not occur is preferable.

The temperature for obtaining the tablet-shaped molding is not particularly limited, provided that the cellulose does not deteriorate. The temperature is preferably less than the glass transition (Tg) temperature of the cellulose, but more preferably less than the Tg minus 50° C. Because there is the probability that the temperature will increase at the time of heat molding, it is desirable the pressing is done during a cooling stage. In the case of a material where deterioration is conspicuous, it is preferable that pressing is done at 0° C. or less.

The molding that is obtained by molding after mixing the cellulose ester resin and the organic additive is that of a block having dimensions in the range of 1 mm×1 mm×1 mm-20 mm×20 mm×20 mm in order to obtain the targeted effects of this invention. In the melt extrusion method, if the molding is smaller than 1 mm×1 mm×1 mm, blocking occurs when charging the molding and the supply is unstable, while if the molding is larger than 20 mm×20 mm×20 mm, the melting and grinding properties are poor and as a result there is a possibility the molding gets stuck in the inlet and production efficiency deteriorates. Further, if the molding is smaller than 1 mm×1 mm×1 mm, the specific surface area becomes excessive, and the contact area with air (particularly oxygen and water) increases too much whereby deterioration of the cellulose tends to result, the molecular weight is reduced and as a result, there is the probability that mechanical strength will decrease. If the molding is larger than 20 mm×20 mm×20 mm in the heat and pressure melting process, it will be difficult to obtain a film of a thickness of less than 100 µm. Further, it also becomes likely that there will be unevenness in film thickness (accuracy of film thickness deteriorates). In forming the molding, mixing and dispersing properties are increased due to increased contact of the resin and the additive, which is also advantageous in preventing deterioration of the cellulose since the contact area with air (particularly oxygen and water) decreases.

To obtain the targeted effects of this invention, it is necessary that the cellulose ester resin is in such a state that the particles are in the molding, and further it is preferable to attain the effects of this invention that the maximum dispersed particle diameter of the organic additives is not greater than 100 μm. Still further, it is not seen as a problem that some of the organic additive penetrates into the interior of the cellulose ester resin particles. In cases when plural kinds of organic additives are employed, each may be in a state of distinct particles or in a state of a mixture. Of these organic additives, typically a plasticizer having the largest added amount of all of the organic additives is the main component exhibiting the maximum dispersed particle diameter.

In cases when the cellulose ester film is obtained via the thermal melting method, a better film with less deterioration is obtained via a production method at a temperature as low as possible and a short residence time. However, when the maximum dispersed particle diameter of the organic additives in the integral molding is greater than 100 μm, in an attempt to obtain a film in a more favorable condition, the melting properties of the additives deteriorate, and as a result there is the possibility that the dispersion of the additives in the film that is obtained has deteriorated. Provided that the maximum dispersed particle diameter of the organic additives in the molding is at most 100 μm, there is no adverse effect on dispersion of the organic additives in the film regardless of how small the maximum dispersed particle diameter is.

It is preferable that the weight average particle diameter of the cellulose ester resin in the molding is in the range of 1-200 μm for good dispersibility during melting and resulting film uniformity. To maintain the weight average particle diameter within the desired range, it is preferable to select an appropriate cellulose ester resin, or to reduce the size of those which are too large. Specifically, when the organic additives are to be included at a high concentration of 10 weight % or more, it is effective that the weight average particle diameter is within the range of 1-200 μm to obtain film uniformity.

A preferable condition to obtain the targeted effects of this invention, is the relationship cDw50>eDmax, wherein cDw50 is the weight average particle diameter of the cellulose ester resin, and eDmax is the maximum dispersed particle diameter of the organic additive. In cases of cDw50≦eDmax, dispersibility of the organic additive in the integral molding deteriorates, because many of the organic additive particles exhibit a larger particle diameter than those of the cellulose ester resin. It is assumed that the effects of this invention are achieved via uniformity of dispersion while heating and melting because the surface of the cellulose ester resin particles in the molding is covered or coated with the organic additive as particles or as impregnated layers.

The particle diameter of the cellulose ester resin may be adjusted by methods such as a dry grinding method, an emulsion dispersion method, a spray drying method and the like.

In the dry grinding method, the cellulose ester resin is ground directly using a jet mill, a hammer type cutter mill or the like when adjusted to produce a desired particle diameter.

The emulsification dispersion method is one in which a solvent such as ethyl acetate is added to the cellulose ester resin and the organic additives, and blended in an agitator and dispersed to obtain a uniform cellulose ester resin composition. Next a dispersion medium in which a solvent such as sodium polyacrylate and a dispersion auxilliary such as alkyl diphenyl ether disodium sulfonate and the like are dissolved is stirred while the cellulose ester resin composition from above is gradually added dropwise, and after an emulsion dispersion is obtained, the liquid is stirred and washed and then filtered to obtain cellulose ester particles.

The spray drying method is one in a solution in which a desired substance is dissolved is sprayed and then dried with hot air to obtain fine particles. A desired particle diameter can be obtained by controlling the concentration of the spray solution, the shape of the spray nozzle, the spray concentration, the temperature and flow of the dry air. Generally, if the diameter of the liquid drops are controlled so as to be small at the time of spraying by diluting the solution and making the gas/liquid ratio large by using 2 liquid nozzles and the like, particles which a small diameter can be obtained. Examples of the device which may be used include a spray dryer manufactured Okahara Processing Machines.

Adjustment of the particle diameter of the organic additive and dispersion and blending of the cellulose acetate propionate can be done using the drying method and the emulsion dispersion method described above, and preparation may also be done using the spray adhesion method.

The spray adhesion method refers to a method in which the cellulose ester resin is charged into a mixer and while stirring, a solution in which the organic additives are dissolved by a solvent is sprayed by a sprayer and the like, and by changing the spraying conditions, the particle diameter of the organic additive is adjusted and dispersion and blending with the cellulose is performed.

For example, the mixture of the cellulose ester and the additives of this invention is preferably subjected to hot air drying or vacuum drying and then subjected to melt extrusion, and then extruded as a film by a T-type die. The film is then caused to contact a cooling drum using an electrostatic printing method and cold fixing is performed to thereby obtain an unstretched film. The temperature of the cooling drum is preferably maintained at 90-150° C.

The melt extrusion may be performed using a uniaxial extruder, a biaxial extruder, or using a biaxial extruder which has a uniaxial extruder connected to the downstream side thereof, but it is preferable that the uniaxial extruder is used in view of the mechanical strength and optical properties of the obtained film. Also, it is preferable that the supply to the raw material tank, the raw material charge section and the extruder interior and the melting process is replaced by an inactive gas such as nitrogen, or that the pressure is reduced.

In giving consideration to manufacturing the film, it is preferable that thermal melting is performed without applying mechanical stress as far as is possible. Examples of existing devices used for manufacturing the film include the uniaxial extruder and the hot pressing machine and the like. In the case of the uniaxial extruder, it is preferable that the extrusion is done at the lowest possible temperature and for the shortest period, at a temperature at which a transparent film can be obtained. It is preferable that the path from the inlet port to the die is set to a temperature in the range between the glass transition temperature Tg and the melting point Tm of the cellulose ester resin, and it is preferable that as the die is approached the temperature is gradually increased. The temperature of the die is preferably set in the range Tm to Tm +30° C. This because deterioration of the cellulose ester resin due to heat is promoted and the deterioration is limited by performing extrusion at the lowest temperature possible. However, because it is necessary to sufficiently melt the cellulose ester resin at the die, a temperature above the melting point is necessary. In the case where the temperature on the path from the die to the inlet port is close to the melting point, deterioration of the cellulose ester resin is outstanding. In the case where the temperature of the die is less than the melting point, the transparency and smoothness of the obtained film deteriorates, and if the temperature is greater than the melting point +30° C., there is the possibility that deterioration will be outstanding.

Residence time (extrusion time) is preferably as short as possible. In this experimental device, it is preferably 20-360 seconds, and more preferably 20-60 seconds. If the residence time is long, there is the possibility that deterioration will be outstanding, but if it is too short, melting may be insufficient. The residence time may be adjusted by the rotation frequency of the shaft, the visco-elasticity of the molding and heating temperature.

In the step for obtaining the molding in this invention, it is possible to obtain a favorable film by heating using a hot pressing device when applying pressure. For example, the thickness of the spacer used at the time of heat molding may be adjusted to a desired thickness and the film can be easily obtained by heating the cellulose ester resin to a temperature close to the melting point.

The temperature at the time of the melt extrusion of this invention is preferably in the range of 150-250° C., and more preferably in the range of 200-240° C.

The maximum dispersion particle diameter of the cellulose ester resin in the obtained polarizing plate protective film is preferably not greater than 0.1 µm. The maximum dispersion diameter of the plasticizer, which is generally included in the largest amount of the all the organic additives, is preferably not more than 0.1 µm. In the case where the maximum dispersion diameter of the organic additives in the obtained molding is greater than 0.1 µm, the dispersion of the additives is insufficient and as result mechanical strength is reduced. Provided that the maximum dispersion particle diameter of the organic additives in the molding is not greater than 0.1 µm, there is no particular adverse effect of reduced mechanical strength regardless of how small the maximum dispersion particle diameter is.

Given that the weight average molecular weight of the cast is Mwt and the weight average molecular weight of the film obtained is Mwf, the molecular weight retention ratio Mwr (%) which is Mwf/Mwt×100, is preferably 85-100%. If Mwr is not greater than 85%, the molecular weight of the cellulose ester resin is reduced too much and sufficient mechanical strength cannot be obtained.

It is particularly preferable that the cellulose ester film used in the polarizing plate protective film of this invention is a film that is formed by stretching is the width direction or in the direction of the formation of the film.

The film is preferably peeled from the cooling drum and the unstretched film that is obtained is heated at a temperature in the range from the glass transition temperature (Tg) of the cellulose ester to Tg +100° C. via a heating device such as plurality of roller groups and/or a infrared ray heater and stretched in a single step or in a plurality of steps. Next, the obtained cellulose ester film which is stretched in the vertical direction as described above, is preferably stretched in the horizontal direction at a temperature in the range of Tg to Tg −20° C. and then the heat-fixing is carried out.

In the case of the horizontal stretching, if the stretching is done while sequentially heating the film at a stretch zone that is divided into more zones which have a temperature difference of 1-50° C., distribution of physical properties in the horizontal direction is reduced and thus this is favorable. Also, if after the horizontal stretching, the film is kept for 0.01-5 minutes at a temperature which not less than the final horizontal stretching temperature and in a range not less than Tg −40° C., the distribution of physical properties in the horizontal direction is further reduced and thus this is favorable.

Heat-fixing is normally done at a temperature higher than the final horizontal stretching temperature and within a range not greater than Tg −20° C., for a period of 0.5-300 seconds. At this time, it is preferable that heat-fixing is done while sequentially increasing temperature at a stretch zone that is divided into more zones which have a temperature difference in the range of 1-100° C.

The film which has been subjected to heat-fixing is usually cooled to a temperature less than Tg, and the clip holding portion of both ends of the film is cut and the film is wound. At this time, it is preferable that a 0.1-10% relaxing process is performed in the horizontal/and or vertical direction at a temperature in a range which is between the final heat-fixing temperature and Tg. Also, the cooling is preferably such that slow cooling from the final heat-fixing temperature to Tg is done at a cooling speed not greater than 100° C. per second. The means for the slow cooling process is not particularly limited and can be performed by means that are known heretofore, but it is particularly preferable to perform these processes while sequentially cooling in a plurality of temperature zones in view of improving dimensional stability of the film. It is to be noted that, given that the final fixing temperature is T1 and the time for the film to reach Tg from the final heat-fixing temperature is t, the value for the cooling rate is determined by (T1−Tg)/t.

The optimal conditions for heat-fixing, cooling, and the slow cooling processes is different depending on the cellulose ester comprising the film, and thus is determined by measuring the physical properties of the biaxially stretched film, and suitably adjusting the conditions to obtain favorable properties.

In addition, after the clip holding portion of both ends of the film that have been cut is subjected to the grinding process or to the granulation process if necessary, it may be reused as material for the same kind of film, or as material for a different type of film.

(Stretching Operation and Refractive Index Control)

In the case where the polarizing plate protective film of this invention is used as a phase difference film, the refractive index may be controlled within a favorable range by stretching. If the stretching is performed by a factor 1.0-2.0 in 1 direction of the cellulose ester and by a factor of 1.01-2.5 in the direction perpendicular to the inside of the plane of the film, the refractive index can be controlled within a favorable range.

For example stretching can be done in the longitudinal direction of the film and in the direction which is perpendicular to the film plane, or in other words the width direction, sequentially or simultaneously. If at this time, the stretching factor in at least one direction is too small, a sufficient phase difference is not obtained, while if it is too large, the stretching is difficult and breakage sometimes occurs.

For example, in the case of stretching in the direction of casting, if contraction in the width direction is too large, the refractive index in the thickness direction becomes too large. In this case, correction can be done by controlling the contraction in the width direction or by stretching in the width direction. In the case of stretching in the width direction, distribution of the refractive index in the width sometimes occurs. This is sometimes seen when the tenter method is used, but a contraction force is generated in the middle portion of the film by stretching in the width direction. This phenomenon occurs because the ends are fixed and is called the bowing phenomenon. In this case also, the bowing phenomenon can be controlled by stretching in the direction of casting, and distribution of the width direction phase difference is reduced to thereby achieve improvement.

Furthermore, by stretching the film in the 2 axial directions that cross each other, variation in film thickness can be reduced. If the variation in the thickness of the polarizing plate protective film is too large, there is unevenness in the phase difference and this poses a problem in terms of unevenness in coloration when used in a liquid crystal display.

The variation in the thickness of the cellulose ester film support is preferably in the range of ±3%, and more preferably ±1%. A method of extrusion in biaxial direction which cross each other is effective in order to achieve objects such as those above, and the stretching is performed such that that the final stretch factor for the biaxial direction which cross each other is in the range of 1.0-2.0 for the casting direction, and 1.01-2.5 for the width direction, and preferably 1.0-1.5 for the casting direction, and 1.05-2.0 for the width direction.

In the case where a cellulose ester is used which obtains positive birefringence with respect to stress a lagging axle for the polarizing plate protective film can be provided in the width direction by stretching in the width direction. In this case, it is preferable that the lagging axle of the polarizing plate protective film is in the width direction in order to improve the display quality in this invention, and the (stretching factor in the width direction) must be less than (stretching factor in the casting direction).

The method for stretching the web is not particularly limited. Examples include, a method in which a plurality of rolls are caused to have differing peripheral speeds and stretching is done in the vertical direction by utilizing the difference in peripheral speed between the rolls; a method in which both ends of the web are fixed with clips or pins and the space of the pins or clips ate extended in the forward direction to thereby carry out stretching in both the vertical and horizontal directions; a method in which widening in the width direction and stretching in the width direction are performed simultaneously; and a method in which widening in the vertical direction and stretching in the vertical direction are performed simultaneously. As a matter of course, these and other methods may be used in combination. In addition, in the case of the so-called tenter method, smooth stretching can be carried out by driving the clip portion using a linear driving method, and this method is favorable because it reduces the danger of breakage and the like.

Maintaining the width or stretching the width in the horizontal direction in the process of preparing the film is preferably performed by a tenter, and may be performed by a pin tenter or a clip tenter.

The thickness of the polarizing plate protective film of this invention is preferably 10-500 μm. In particular a thickness no less than 20 μm is preferable and no less than 35 μm is more preferable. Also a thickness no greater than 150 μm is preferable and no greater than 120 μm is more preferable. In particular, a thickness is a thickness between 25 and 90 μm. If the polarizing plate protective film is thicker than the above range, the polarizing plate will be too thick after polarizing plate processing, and the thickness will be unsuitable for the liquid crystal displays used in notebook type personal computers and mobile electronic devices which, in particular, need to be thin and lightweight. On the other hand, if the polarizing plate protective film is thinner than the above-described range, expression of retardation will be difficult, and the water vapor permeability of the film will be high while the ability of the film to protect itself against humidity will be reduced.

The lagging axle or the advance axle is present in the film plane and given that the angle formed in the direction of film formation is $\theta 1$, $\theta 1$ is preferably between −1° and +1°, and more preferably between −0.5° and +0.5°. $\theta 1$ can be defined as the orientation angle and can be measured using KOBRA-21ADH (manufactured by Oji Measuring Instruments Co., Ltd.).

If $\theta 1$ satisfies the above-described relationships, the displayed image will have a high luminance and this can contribute to the suppression or prevention of the escaping of light and thereby contribute to faithful color reproduction in the color liquid crystal display device.

(Functional Layers)

When manufacturing the polarizing plate protective film of this invention is created, an antistatic layer, a hard coat layer, a antireflection layer, matting facilitating layer, a contact facilitating layer, an antiglare layer, a barrier layer, an optical compensation layer, or the like may be provided. It is preferable that at least one layer selected from the antistatic layer, the hard coat layer, the antireflection layer, the contact facilitating layer, the antiglare layer and the optical compensation layer is provided. At this time, various surface treatments such a corona discharge treatment, plasma treatment, chemical treatment and the like may be carried out as necessary.

A composition including cellulose resin having different concentrations of additives such as the plasticizer, ultraviolet light absorbers and the like which are described above may be co-extruded to form a cellulose ester film having a layered structure.

For example, a cellulose ester film can be made so as to have a structure of skin layer/core layer/skin layer. The matting agent may be provided in a large amount in the skin layers or alternatively, may be put only in the skin layers. The plasticizer and the ultraviolet light absorber may be provided in a larger amount in the core layer than in the skin layer, or may be put only in the core layer. The types of plasticizers and ultraviolet light absorbers in the core layer and the skin may be changed and a low volatility plasticizer and/or an ultraviolet light absorber may be added to the skin layer, while a plasticizer with excellent plasticity or an ultraviolet light absorber with excellent ultraviolet light absorbing properties may be added to the core layer. The Tg of the skin layer and the core layer may be different, and it is preferably that the Tg of the core layer is lower than the Tg of the skin layer. Furthermore, the viscosity of the melt including the cellulose ester at the time of melt casting may be different in the skin layer and the core layer and the viscosity of the skin layer may be greater than the viscosity of the core layer or the viscosity of the core layer may be greater than or equal to the viscosity of the viscosity of the skin layer.

(Polarizing Plate)

The Method for manufacturing the polarizing plate having the polarizing plate protective film of this invention is not particularly limited, and may be prepared by any commonly used method. One example is a method in which the obtained polarizing plate protective film is adhered to both surfaces of the polarizing elements using a completely saponified polyvinyl alcohol solution. The polarizing elements are prepared by being subjected to alkali treatment and then a polyvinyl alcohol film is immersed in an iodine solution and extrusion is performed.

A contact facilitating process such as those described in JP-A 6-94915 and 6-118232 may be performed in place of the above-described alkali processing.

The polarizing plate comprises the polarizing element and the protective film which protects both sides of the polarizing element. The polarizing plate may also be configured such that one protective film is adhered to one surface and a separating film is adhered to the opposite surface. The protective film and the separating film are for protecting the polarizing plate at the time of shipping and product inspection and the like. At these times, the protective film is pasted on for protecting the surface of the polarizing plate and is used on the opposite surface from the surface where the polarizing plate is pasted to the liquid crystal plate. The separating film is for covering the adhesion layer to which the liquid crystal plate is pasted, and is used on surface where the polarizing plate is pasted to the liquid crystal cell.

(Liquid Crystal Display Device)

A liquid crystal display device usually has disposed therein a substrate comprising a liquid crystal between two polarizing plates, but the polarizing plate protective film of this invention achieves excellent display properties regardless of where it is disposed. In particular, because a clear hard coat layer, an antistatic layer, a antireflection layer and the like are provided on the polarizing plate protective film which is the surface closest to the display side of the liquid crystal display device, it is preferable that the polarizing plate protective film is used at this portion. In addition, the polarizing plate protective film of this invention that has been stretched is preferably used a phase difference film for expanding the visibility angle of the film.

EXAMPLE

The following is a more specific description of this invention using examples, but the invention is not to be limited by these examples.

<<Evaluation Method>>

First, all the evaluation methods will be described.

(1) The weight average particle diameter of the obtained particles was measured using a flow type particle image analyzer FIPA-2000 (manufactured by Toa Medical Electronics).

(2) Size of the Molding

The length, width and height of the molding were measured, and the average value at 10 random locations was calculated. Moldings that were less than 2 mm×2 mm×2 mm were measured using a hand magnifying lens (×10) featuring a scale.

(3) Maximum Dispersion Particle Diameter of the Additives

The obtained molding is adjusted using an $OsO_4$ dye ultra-thin sectioning method, and observed using a transmission electron microscope (H-7100FA model manufactured by Hitachi). The composition of the fine particles that were observed in the molding were identified using the FESTEM-EDX method (Field Emission-type Scanning Transmission Electron Microscope: FESTEM; HB 501, manufactured by VG Company).

Particle shape varies depending on the additive and the method of addition, but needle shaped particles and spherical particles (from which P is detected) were observed using EDX analysis. In addition, no particles greater than 0.01 μm were observed in Examples 7 and 9, but P was detected in all particles.

(4) Volume Specific Resistance 0.8 g of cellulose ester acetate fine particles were charged into a commercially available infrared absorbing spectral gauge tablet molding (in which cutting surface inside the molding is a 20 mm circle), and 400 Kg/cm² pressure was applied using a hydraulic press and cylindrical pellets of a thickness of 2 mm and both end surfaces of which have a diameter of 20 mm were prepared in dry $N_2$ environment. A main electrode of a diameter of 10 mm was coated with gold paste and made to contact the middle of both circular end portions of the pellet. Next, a guard electrode in which one end is grounded is provide along the outer peripheral portion of the pellet, after which 500 V of direct current are applied to the main electrode, while the current flowing between the main electrodes was read directly using an ammeter. The volume specific resistance was calculated from the current value when a stable level is reached. The environment for measuring is a temperature of 23° C. and 50% RH, and the measurement is repeated 5 times and the average thereof is taken to thereby obtain the measured value.

(5) Dispersion of the Additives in the Film

The obtained film is adjusted using an $OsO_4$ dye ultra-thin sectioning method, and observed using a transmission electron microscrope (H-7100FA model manufactured by Hitachi). The composition of the fine particles that are observed in the molding are identified using the FESTEM-EDX method (Field Emission-type Scanning Transmission Electron Microscope; HB 501 manufactured by FESTEM; VG Company).

Spherical particles and a sea-island shaped particles (P was detected from both particles) were observed using EDX analysis.

In the examples, no additives greater than 0.01 μm were observed, but P was detected in all particles.

(6) Measurement of Molecular Weight

The molecular weight of the obtained molding and film are measured using the GPC (HLC-8220 manufactured by Toso).

Mwt: Weight average molecular weight of the cast

Mwf: Weight average molecular weight of the film

Mwr: Weight average molecular retention ratio (%)=Mwf/Mwt×100

(7) Measurement of the Modulus of Elasticity

The obtained film was cut so as to have a width of 5 mm, and subjected to humidifying conditioning for 2 hours in a testing laboratory where the environment is adjusted to 23° C. and 70% RH. The stress was measured using a universal tensioning device STM T50BP manufactured by Toyo-Baldwin for 0.5% stretching at a tensioning rate of 10% per minute, and the modulus of elasticity was obtained.

(8) pH and Electric Conductivity of the Cellulose Ester Resin 1 g of cellulose acetate propionate was charged into 20 ml of pure water (at an electrical conductivity of 0.1 μs/cm and a pH of 6.8) and mixed in a nitrogen environment for 1 hour at 25° C. The pH was measured by a pH meter (HM-30V pH meter manufactured by TOA) and the electrical conductivity was measured by a conductivity meter (conductivity meter SC-51 manufactured by Yokogawa Electric Corporation)

<<Material and Manufacturing Method Thereof>>

(Cellulose Ester Resin)

The cellulose ester resin in this example is obtained from a raw material of pure cotton linter or wood pulp having a high level of purity, and may be manufactured uses any of widely known methods called the mixed acid method, the methylene chloride method, an the benzene method.

Cellulose acetate propionate used in this example is obtained by the mixed acids method, and is produced via an esterification step, a hydrolysis step, a filtering step, a precipitation step, a water-washing step, a dehydrating step, a drying step and a classification (sieve) step. Because the object of this is to obtain a film by thermal melting, particular care must be taken in the water-washing step. This is because even of a small amount of the organic solvent used in the production step remains, it may promote decomposition of the cellulose ester resin at the time of thermal melting. That is to say, it is preferable that 1 g of cellulose acetate propionate was charged into 20 ml of pure water (electrical conductivity 0.1 μs/cm and pH 6.8) and stirred in a nitrogen environment for 1 hour at 25° C. and washed until the pH is 6-7 and the electrical conductivity is 1-100 μs/cm. In this invention the cellulose acetate propionate which is obtained from the production method described above is water-washed once again (post-washing). By simply changing the conditions of the post washing, four types of cellulose ester propionate can be prepared. Cellulose acetate propionates 1, 2 and 3 are obtained by changing the frequency of post-washing. The post-washing was performed 0, 1 and 3 times respectively in the Cellulose acetate propionates 1, 2, and 3. Cellulose acetate propionate 4 was prepared by washing cellulose acetate propionate 1 in a distilled alkali solution (pH 8.0) and then water-washing once in pure water.

The post-washing is performed by pouring 20 L of pure water in a 50 L lab pail, and 1000 g of cellulose acetate propionate was charged thereto and stirred for 30 minutes and then dehydration was performed in a centrifugal separator. The cellulose acetate propionates 1-4 were performed by repeating this operation.

The cellulose acetate propionate which has been subjected to post-washing and dehydration is put in a thermostatic dryer that is set at 50° C., and suitably mixed for every hour and dried for 12 hours.

The dried cellulose acetate propionate was classified using a sieve shaker equipped with a 30 mesh sieve was used (500 μm openings). The diameter of the measured cellulose acetate propionate that was classified was measured and the weight average particle diameter was found to be 350 μm.

(Basic Properties of the Cellulose Acetate Propionate Used in this Invention)

Molecular weight: 96,000
Melting Point: 225-235° C.
Tg: 170-180° C.
Degree of propyl substitution: 0.65
Degree of acid substitution: 1.95
Weight average particle diameter: 350 μm
(pH and Electrical Conductivity)

1 g of classified cellulose acetate propionate was charged into 20 ml of pure water (electrical conductivity 0.1 μs/cm and pH 6.8) and stirred in a nitrogen environment for 1 hour at 25° C. The pH and the electrical conductivity were then measured.

TABLE 1

| Cellulose Ester Resin | pH | Electrical Conductivity |
|---|---|---|
| cellulose acetate propionate 1 | 5.5 | 120 μS/cm |
| cellulose acetate propionate 2 | 6.0 | 95 μS/cm |
| cellulose acetate propionate 3 | 6.5 | 35 μS/cm |
| cellulose acetate propionate 4 | 7.5 | 130 μS/cm |

(Adjustment of Cellulose Acetate Propionate Diameter)

The diameter of the cellulose acetate propionate used in this invention is adjusted by a dry grinding method, an emulsification dispersion method, a spray dry method or the like.

The dry grinding method is performed using a jet mill, a hammer-type cutter mill or the like. In this example, grinding was carried out in a jet mill grinder (manufactured by Seishin Enterprise Co., Ltd.) under conditions of nozzle pressure of 0.7 MPa, air flow 1.1 m$^3$/min, and processing rate 500 g/hr with a suitably selected pass frequency so a to obtain particles of a desired diameter. The obtained cellulose acetate propionate particles were dried in a vacuum dryer (DP41 manufactured by Yamato) at a temperature of 90° C. while operating a vacuum pump for 5 hr (at a reduced pressure of $1.33 \times 10^2$ Pa or less).

In the emulsification dispersion method, 180 g of cellulose acetate propionate (with weight average particle diameter of 350 μm) and 20 g of triphenyl phosphate and 800 g ethyl acetate as the organic solvent were added to a 3 L glass flask and blended for 3 hours with a stirrer. Dispersion was then performed to obtain a uniform cellulose ester composition. The dispersing medium was prepared with 100 g of sodium polyacrylate (manufactured by Wako Pure Chemical Industries Ltd.; average degree of polymerization n=2700-7500; water content 80 weight percent) as the dispersing agent and 1 g of alkyl diphenyl ether sodium disulfonate is dissolved in 1000 g of ion exchanged water as the dispersion auxiliary. 1000 g of the aqueous medium was put into a 3 L round bottom stainless steel container and mixed under conditions described hereinafter in a TK homogenizer (manufactured by Tokushu Kika Kogyo) while gradually adding the above resin composition dropwise and 300 g were charged over a period of 10 minutes. After charging of the resin composition was complete, stirring was done for another 10 minutes to carry out emulsification. This operation is carried out 3 times and 900 g of the resin composition was emulsified. Subsequently, the ethyl acetate was eliminated under conditions of 50-55° C. and $1.33 \times 10^4$ Pa-$3.99 \times 10^4$ Pa, and the resultant was cooled and then separated in three 5 L beaker and ion exchanged water was charged such that the total amount of liquid in each beaker was 2 L and then decantation was performed twice. Next stir-washing and filtration are performed using 2 L of ion exchanged water at room temperature, and each is repeated three times. The obtained cellulose acetate propionate was put in a thermostatic dryer that is set at 50° C., and suitably mixed for every hour and dried for 12 hours. Drying was further done in a vacuum dryer (DP41 manufactured by Yamato) under conditions of a temperature of 90° C. while operating a vacuum pump for 5 hr (at a reduced pressure of $1.33 \times 10^2$ Pa or less).

(Adjustment of the Organic Additive and Dispersion and Blending of the Cellulose Acetate Propionate)

Adjustment of the organic additive and dispersion and blending of the cellulose acetate propionate used in this invention may be done using a dry method, an emulsification dispersion method, a spray adhesion method and the like.

The dry grinding method is performed using a jet mill, a hammer type cutter mill or a Henschel mixer. 100 g of triphenyl phosphate which is used as an organic additive in this invention is grounded in a mortar beforehand and then a constant weight was obtained in a vacuum dryer (DP41 manufactured by Yamato) under conditions of a temperature of 30° C. while operating a vacuum pump for 5 hrs. Next 100 g of the constant weight organic additive was added to 900 g of the cellulose ester resin particles and stirred in a Henschel mixer under the conditions shown in Table 2, and adjustment of particles of the organic additive and blending of the cellulose was there by performed.

The emulsification dispersion method is performed in the same manner as that described for adjusting the diameter of the cellulose acetate propionate.

In the spray adhesion method, 20 g of triphenyl phosphate as the organic additive is dissolved in 20 g of ethanol to obtain a 50 weight percent additive and ethanol solution. 180 g of cellulose acetate propionate was charged into a closed type table-top mixer and stirred at 20 rpm while spraying the additive and ethanol solution with a sprayer, and adjustment of particles of the organic additive and blending with cellulose was there by performed.

(Method for Manufacturing the Molding)

FIGS. 1(A)-1(D) show the jig for forming the device used in this example.

A square frame-shaped spacer (5-50 mm thick) made from stainless steel is placed on a specular stainless steel plate and the obtained cellulose ester resin fine particles including the additives are put into the concave portion formed by the spacer. After the particles are made flat by the blade, a stainless steel plate having a prescribed thickness (10 mm-25 mm) is fit into the square frame-shaped stainless steel spacer (the cavity of the concave portion). Pressure is applied in a pressing machine at room temperature (20-25° C.) and a pressure of and a pressure of $2.94 \times 10^7$ Pa for 10 minutes, and flat cellulose ester resin molding including additives was thereby obtained. The thickness of the jigs such as the spacer can be suitably adjusted in order for the cast to have a desired thickness. Also, the above operations may be performed repeatedly as necessary in order to adjust to the desired thickness.

The obtained flat cast is transferred to a separate stainless steel plate, and a sharp rapper is placed on one side of the plate having a plurality of rectangular boxes (shown in FIG. 1(F-1)), and pressure was applied at $4.9 \times 10^6$ Pa for a period of 1 minute and a square cast having a desired size was thereby obtained.

The temperature for molding is a temperature at which the cellulose does not deteriorate. The temperature is preferably less than the glass transition (Tg) temperature of the cellulose, and more preferably less than the Tg minus 50° C. Because there is the possibility that temperature will increase at the time of heat molding, it is desirable that the pressing is done while cooling. In the case of a material for which deterioration is conspicuous, it is preferable that pressing is done at 0° C. or less.

Example 1

Particle Diameter Adjustment of Cellulose Ester Resin and Additive 1,000 g of cellulose acetate propionate 3 shown in Table 1 which is the cellulose ester resin was ground in a jet mill grinder (manufactured by Seishin Enterprise Co., Ltd.) under conditions of nozzle pressure of 0.7 MPa, air flow of 1.1 m$^3$/min, and processing rate of 500 g/hr and 2 passes were done to obtain fine particles. The obtained cellulose acetate propionate particles were dried in a vacuum dryer (DP41, manufactured by Yamato Scientific Co., Ltd.) under conditions of a temperature of 90° C. while operating a vacuum pump for 5 hrs (at a reduced pressure of $1.33 \times 10^2$ Pa or less).

Constant weight was obtained for 100 g of triphenyl phosphate which is used as an organic additive in a vacuum dryer (DP41 manufactured by Yamato Scientific Co., Ltd.) under conditions of a temperature of 30° C. for 5 hrs while operating a vacuum pump (at a reduced pressure of $1.33 \times 10^2$ Pa or less). Next 100 g of the constant weight triphenyl phosphate was added to 900 g of the cellulose ester resin particles and stirred in a Henschel mixer under for 3 minutes at 2,000 rpm, and dispersion of the additive and blending of the cellulose therewith was performed.

(Method for Manufacturing the Molding)

A square frame-shaped spacer (20 mm thick) made from stainless steel is placed on the specular stainless steel plate shown in FIG. 1(B) and the obtained cellulose ester resin fine particles including the additives are put into the concave portion formed by the spacer. After the particles are made flat by the blade, a stainless steel plate having a prescribed thickness (10 mm) is fit into the square frame-shaped stainless steel spacer (the cavity of the concave portion). Pressure is then applied at 25° C. and a pressure of $2.9 \times 10^7$ Pa for 10 minutes, and flat cellulose ester resin molding including additives was thereby obtained. The obtained flat cast is transferred to a separate stainless steel plate, and a sharp rapper is placed on the plate having a plurality of rectangular boxes on one surface is placed thereon, and pressure is applied at $4.9 \times 10^6$ Pa for 1 minute and a square cast having a desired size shown in Table 2 is thereby obtained.

(Method of Manufacturing the Film)

The obtained molding is subjected to T die extrusion using a Haake PolyLab System uniaxial extruder to obtain a film having a thickness of 80-90 μm.

Die: 0.5 mm x 20 cm

Temperature: temp. 1 200° C., temp. 2 210° C., temp. 3 220° C., die temp. 230° C.

(The higher temperature is the extrusion temperature toward the die. The heater portion including the die has 4 blocks.

Rotation frequency: 100 rpm

Residence time: 60 seconds

Take speed: 350±50 mm/sec (Suitable adjustment was done to obtain the desired thickness.)

The characteristics of the obtained film are shown in Table 3.

Example 2

Particle Diameter Adjustment of Cellulose Ester Resin and Additive

This was done in the same manner as Example 1 except that the pass frequency for the jet mill was once and Henschel mixer was operated at 800 rpm×3 min.

(Method for Manufacturing the Molding)

The method was the same as in Example 1 except that the thickness of the square frame-shaped stainless steel spacer, the thickness of the stainless steel plate that is fit into the cavity of the concave portion and the pattern of the rapper are changed to those shown in Table 2.

(Method for Manufacturing the Film)

This was the same as that of Example 1.

Example 3

Particle Diameter Adjustment of Cellulose Ester Resin and Additive

This was done in the same manner as Example 1 except that the pass frequency for the jet mill was thrice and the Henschel mixer was operated at 3,000 rpm for 3 min.

(Method for Manufacturing the Molding)

This was the same as that of Example 1.

(Method for Manufacturing the Film)

This was the same as that of Example 1.

Example 4

Particle Diameter Adjustment of Cellulose Ester Resin and Additive 1,000 g of cellulose acetate propionate 3 which is the cellulose ester resin was ground in a jet mill grinder (manufactured by Seishin Enterprise Co., Ltd.) under conditions such that the nozzle pressure was 0.7 MPa, air flow was 1.1 m³/min, and processing rate was 500 g/hr and 3 passes were done to obtain fine particles. Next, 20 g of triphenyl phosphate were dissolved in 20 g of ethanol to obtain a 50 weight percent additive and ethanol solution 180 g of cellulose ester resin particles was charged into a closed type table-top mixer and stirred at 20 rpm while spraying the additive and ethanol solution with a sprayer and dispersion of the additive and blending with cellulose was there by performed. The obtained cellulose ester resin particles were put in a thermostatic dryer that was set at 50° C. and suitably mixed for every hour and drying was done for 12 hours. The particles were further dried for 5 hours in a vacuum dryer (DP41 manufactured by Yamato Scientific Co., Ltd.) under conditions of a temperature of 90° C. while operating a vacuum pump (at a reduced pressure of $1.33 \times 10^2$ Pa or less).

(Method for Manufacturing the Molding)

The method was the same as in Example 1 except that the thickness of the square frame-shaped stainless steel spacer, the thickness of the stainless steel plate that is fit into the cavity of the concave portion and the pattern of the rapper are changed to those of another table.

(Method for Manufacturing the Film)

This was the same as that of Example 1.

Example 5

Particle Diameter Adjustment of Cellulose Ester Resin and Additive

This was the same as that of Example 4.
(Method for Manufacturing the Molding)
This was the same as that of Example 1.
(Method for Manufacturing the Film)
This was the same as that of Example 1.

Example 6

Particle Diameter Adjustment of Cellulose Ester Resin and Additive

This was the same as that of Example 1 except that the cellulose ester resin was replaced by cellulose acetate propionate 2.
(Method for Manufacturing the Molding)
This was the same as that of Example 1.
(Method for Manufacturing the Film)
This was the same as that of Example 1.

Example 7

Particle Diameter Adjustment of Cellulose Ester Resin and Additive

Placed with a 3 L glass flask were 180 g of cellulose acetate propionate 2 as the cellulose ester resin, 20 g of triphenyl phosphate and 800 g ethyl acetate as the additive and blended for 3 hours with a stirrer. Dispersion was then performed to obtain a uniform cellulose ester composition.

A dispersing medium was prepared of 100 g of sodium polyacrylate (manufactured by Wako Pure Chemical Industries Ltd.; average degree of polymerization n=2,700-7,500; water content 80 weight %) as the dispersing agent and 1 g of alkyl diphenyl ether sodium disulfonate was dissolved in 1,000 g of ion exchanged water servicing as the dispersion auxilliary. Then 1,000 g of the aqueous medium were charged into a 3 L round-bottomed stainless steel container, and 300 g of the above resin composition was gradually dripped over a period of 10 minutes while stirring at 12,000 rpm for 10 min. in a T.K. Homo Mixer (manufactured by Tokushu Kika Kogyo Co., Ltd.). After charging of the resin composition was completed, stirring was continued for further 10 minutes to carry out emulsification. This operation was carried out 3 times whereby 900 g of the resin composition was emulsified.

Subsequently, the ethyl acetate was eliminated under conditions of 50-55° C. and $1.33 \times 10^4$ Pa-$3.99 \times 10^4$ Pa, and the resultant component was cooled and then separated into three 5 L beakers, and ion exchanged water was charged so that the total amount of liquid in each beaker was 2 L, after which decantation was performed twice. Further, stir-washing and filtration was repeated three times using 2 L of ion exchanged water at room temperature. The obtained cellulose ester resin particles were dried in a vacuum dryer (DP41 manufactured by Yamato) under conditions described in the following table.

(Method for Manufacturing the Molding)
This was the same method as that of Example 1.
(Method for Manufacturing the Film)
This was also the same method as that of Example 1.

Example 8

Particle Diameter Adjustment of Cellulose Ester Resin and Additive

This adjustment was conducted in the same manner as Example 1 except that cellulose acetate propionate 3 was employed without grinding by a jet mill, and the operating conditions of a Henschel Mixer were set at 500 rpm for 3 minutes.

(Method for Manufacturing the Molding)
This was the same method as that of Example 1.
(Method for Manufacturing the Film)
This was the same method as that of Example 1.

Example 9

This preparation was conducted in the same manner as Example 7, except that the mixing condition with T.K. Homo Mixer (manufactured by Tokushu Kika Kogyo Co., Ltd.) was changed to 16,000 rpm over 30 minutes.

Example 10

This preparation was conducted in the same manner as Example 1, except that cellulose ester resin was replaced by cellulose acetate propionate 1.

Example 11

This preparation was conducted in the same manner as Example 1, except that cellulose ester resin was replaced by cellulose acetate propionate 4.

Example 12

This preparation was conducted in the same manner as Example 3, except that conditions of a Henschel Mixer were changed to 800 rpm over 3 minutes.

Example 13

Particle Diameter Adjustment of Cellulose Ester Resin and Additive

As a cellulose ester resin, cellulose acetate propionate 3 was employed, 1,000 g of which was ground using a jet mill pulverizer (manufactured by Seishin Enterprise Co., Ltd.) under conditions of a nozzle pressure of 0.7 MPa, an airflow of 1.1 m³/min., and a processing rate of 500 g/hr., during three passes to obtain minute particles. The obtained minute particles of the cellulose ester resin were dried using a vacuum dryer (DP41, manufactured by Yamato Scientific Co., Ltd.) at a temperature of 90° C. and at a reduced pressure of $1.33 \times 10^2$ Pa or less for 2 hr. using a vacuum pump.

| (Organic additive) | |
|---|---|
| Plasticizer: Triphenyl phosphate<br>The plasticizer was subjected to a constant weight treatment using a vacuum dryer (DP41, manufactured by Yamato Scientific Co., Ltd.) at 30° C. for 5 hr. and at a reduced pressure of $1.33 \times 10^2$ Pa or less. | 100 g |
| Antioxidant: Tinuvin 144 (produced by Ciba Specialty Chemicals) | 5 g |
| UV absorber: LA-31 (produced Asahi Denka Co., Ltd.) | 12 g |
| (Inorganic additive) | |
| Slipping agent: R972V (produced by Nippon Aerosil Co., Ltd.) | 3 g |

To 880 g of the minute particles of the cellulose ester resin, added were above organic additives and the inorganic additive, which were stirred using a Henschel mixer at 3,000 rpm for 3 min., and thus adequate mixing and blending of the additives and the cellulose was achieved.

(Method for Manufacturing the Molding)

The manufacturing method was the same as for Example 1 except that the thickness of the square frame-shaped stainless steel spacer, the thickness of the stainless steel plate that was fit into the cavity of the concave portion and the pattern of the die cutting were changed to those described in Table 2. The obtained molding was dried while operating a vacuum pump (DP41, manufactured by Yamato Scientific Co., Ltd.) at 130° C. for 3 hr. in dry −40° C. dew point $N_2$ gas atmosphere from the purging portions. The water content of the molding after drying was measured using a Karl Fisher Moisture Meter (manufactured by Dia Instruments Co., Ltd.) with a coulometric titration method, to result in 90 ppm.

(Method for Manufacturing the Film)

This was the same method as that of Example 1.

Example 14

Particle Diameter Adjustment of the Cellulose Ester Resin and the Additive

This was the same method as that of Example 13.

(Method for Manufacturing the Molding)

The manufacturing method was the same as for Example 1 except that the thickness of the square frame-shaped stainless steel spacer, the thickness of the stainless steel plate that was fitted into the cavity of the concave portion and the pattern of the die cutting were changed to those described in Table 2. The obtained molding was dried under vacuum via a pump (DP41, manufactured by Yamato Scientific Co., Ltd.) at 130° C. for 3 hr. in dry −40° C. dew point $N_2$ gas atmosphere from the purging portions. The water content of the molding after drying was measured using a Karl Fisher Moisture Meter (manufactured by Dia Instruments Co., Ltd.) with a coulometric titration method, which resulted in 120 ppm.

(Method for Manufacturing the Film)

This was the same method as that of Example 1.

Comparative Example 1

Particle Diameter Adjustment of Cellulose Ester Resin and Additive

This was the same method as that of Example 1.

(Method for Manufacturing the Molding)

The manufacturing method was the same as in Example 1 except that the thickness of the square frame-shaped stainless steel spacer, the thickness of the stainless steel plate that was fitted into the cavity of the concave portion and the pattern of the die cutting were changed to those described in another table.

(Method for Manufacturing Film)

This method was conducted in the same manner as Example 1, but the slot of the extruder clogged with the molding and its supply became unstable, so that it became impossible to obtain an evaluable film.

Comparative Example 2

Particle Diameter Adjustment of Cellulose Ester Resin and Additive

This was the same method as that of Example 1. [0210]: [0201]rev.: [0197]ori.

(Method for Manufacturing the Molding)

The manufacturing method was the same as in Example 1 except that the thickness of the square frame-shaped stainless steel spacer, the thickness of the stainless steel plate that was fit into the cavity of the concave portion and the pattern of the rapper were changed to those described in the other table.

(Method for Manufacturing the Film)

This was the same as that of Example 1, but the molding caused blocking at the inlet, resulting in forced outage of the machine, and then it was not possible to obtain a film that could be evaluated.

The pattern diagrams of TEM observation of the cellulose ester resins and the organic additive which were molded in Examples and Comparative examples are shown in FIGS. 2(A)-2(F).

The evaluation of the moldings and the cellulose ester films was conducted based on with the evaluation methods described above, and the results are shown in Tables 2 and 3.

TABLE 2

| | Composition | | | | Characteristics of cellulose ester fine particles | | | | Characteristics of film | | | | |
|---|---|---|---|---|---|---|---|---|---|---|---|---|---|
| | Cellulose ester resin | | Organic additive | | | | | | Weight average molecular weight of molding (Mwt) | Weight average molecular weight of film (Mwf) | Molecular weight retention ratio (Mwr) | Modulus of Elasticity (GPa) | |
| | Name | Particle diameter (μm) | Name | Maximum Dispersed particle diameter (μm) | pH | Electrical Conductivity (μS/cm) | Volume specific resistance (Ω·cm) | Dispersibility of organic additive in film | | | | MD | TD |
| Example 1 | Cellulose acetate propionate 3 | 100 | Triphenyl Phosphate | 30 | 6.5 | 35 | $2.0 \times 10^{14}$ | Additive of 0.01 μm or more was not observed | 226400 | 215080 | 95.0 | 3.3 | 3.3 |
| Example 2 | Cellulose acetate propionate 3 | 190 | Triphenyl Phosphate | 98 | 6.5 | 35 | $2.8 \times 10^{14}$ | Additive of 0.01-0.05 μm was observed as a sea island shape | 228600 | 205800 | 90.0 | 3.0 | 2.9 |
| Example 3 | Cellulose acetate propionate 3 | 20 | Triphenyl Phosphate | 10 | 6.5 | 35 | $1.2 \times 10^{14}$ | Additive of 0.01 μm or more was not observed | 204800 | 198600 | 97.0 | 3.4 | 3.4 |
| Example 4 | Cellulose acetate propionate 3 | 20 | Triphenyl Phosphate | 0.3 | 6.5 | 35 | $9.0 \times 10^{14}$ | Additive of 0.01 μm or more was not observed | 204800 | 200600 | 97.9 | 3.5 | 3.5 |
| Example 5 | Cellulose acetate propionate 3 | 20 | Triphenyl Phosphate | 0.3 | 6.5 | 35 | $5.1 \times 10^{14}$ | Additive of 0.01 μm or more was not observed | 204800 | 202400 | 98.8 | 3.5 | 3.5 |
| Example 6 | Cellulose acetate propionate 2 | 100 | Triphenyl Phosphate | 30 | 6.0 | 95 | $2.1 \times 10^{12}$ | Additive of 0.01 μm or more was not observed. | 226400 | 202800 | 89.6 | 3.1 | 3.0 |
| Example 7 | Cellulose acetate propionate 2 | 2 | Triphenyl Phosphate | *1 | 6.1 | 90 | $1.1 \times 10^{11}$ | Additive of 0.01 μm or more was not observed | 232200 | 198200 | 85.4 | 2.5 | 2.3 |
| Example 8 | Cellulose acetate propionate 3 | 350 | Triphenyl Phosphate | 110 | 6.5 | 35 | $3.2 \times 10^{13}$ | Additive of about 0.1-0.3 μm was observed as particles | 226400 | 206000 | 78.0 | 1.9 | 1.5 |
| Example 9 | Cellulose acetate propionate 2 | 0.8 | Triphenyl Phosphate | *1 | 6.5 | 35 | $8.2 \times 10^{10}$ | Additive of 0.01 μm or more was not observed | 231600 | 135600 | 58.5 | 1.7 | 1.6 |
| Example 10 | Cellulose acetate propionate 1 | 100 | Triphenyl Phosphate | 30 | 5.5 | 120 | $1.6 \times 10^{10}$ | Additive of 0.01 μm or more was not observed | 226400 | 102400 | 45.2 | 1.5 | 1.4 |
| Example 11 | Cellulose acetate | 100 | Triphenyl phosphate | 30 | 7.5 | 130 | $3.4 \times 10^{10}$ | Additive of 0.01 μm | 226400 | 82400 | 36.4 | 1.2 | 1.1 |

TABLE 2-continued

| | Composition | | | | Characteristics of cellulose ester fine particles | | | | Characteristics of film | | | | |
|---|---|---|---|---|---|---|---|---|---|---|---|---|---|
| | Cellulose ester resin | | Organic additive | | | | | | Weight average molecular weight of molding (Mwt) | Weight average molecular weight of film (Mwf) | Molecular weight retention ratio (Mwr) | Modulus of Elasticity (GPa) | |
| | Name | Particle diameter (μm) | Name | Maximum Dispersed particle diameter (μm) | pH | Electrical Conductivity (μS/cm) | Volume specific resistance (Ω·cm) | Dispersibility of organic additive in film | | | | MD | TD |
| Example 12 | Cellulose acetate propionate 3 | 20 | Triphenyl Phosphate | 98 | 6.5 | 35 | $1.2 \times 10^{12}$ | propionate 4 or more was not observed Additive of 0.01-0.05 μm was observed as a sea island shape | 204800 | 158600 | 77.4 | 1.9 | 1.6 |
| Example 13 | Cellulose acetate propionate 3 | 20 | Triphenyl phosphate, Tinuvin 144 (0.5), LA31 (1.2), R927V (0.1) | 10 | 6.5 | 35 | $9.1 \times 10^{14}$ | Additive of 0.01 μm or more was not observed | 204800 | 204200 | 99.7 | 3.5 | 3.2 |
| Example 14 | Cellulose acetate propionate 3 | 20 | Triphenyl phosphate, Tinuvin 144 (0.5), LA31 (1.2), R927V (0.1) | 10 | 6.5 | 35 | $5.0 \times 10^{14}$ | Additive of 0.01 μm or more was not observed | 204800 | 204500 | 99.9 | 3.5 | 3.3 |
| Comparative example 1 | Cellulose acetate propionate 3 | 100 | Triphenyl Phosphate | 30 | 6.5 | 35 | $2.2 \times 10^{14}$ | It could not make evaluable film | | | | | |
| Comparative example 2 | Cellulose acetate propionate 3 | 100 | Triphenyl Phosphate | 30 | 6.5 | 35 | $1.9 \times 10^{14}$ | It could not make evaluable film | | | | | |

*1: Additive of 0.1 μm or more was not observed. P was detected.

TABLE 3

| | Particle diameter adjustment of cellulose | | | | Particle diameter adjustment of organic additive | | |
|---|---|---|---|---|---|---|---|
| Sample | Method | Jet mill Number of passes | Emulsifying dispersion Rotation number × Time | Weight Average particle diameter (μm) | Method | Henschel mixer (Rotation number × Time) | Maximum Dispersed Particle diameter of additive (μm) |
| Example 1 | Dry ground | 2 | — | 100 | Dry ground | 2000 rpm × 3 min | 30 |
| Example 2 | Dry ground | 1 | — | 190 | Dry ground | 800 rpm × 3 min | 98 |
| Example 3 | Dry ground | 3 | — | 20 | Dry ground | 3000 rpm × 3 min | 10 |
| Example 4 | Dry ground | 3 | — | 20 | Spray Adhesion | — | 0.3 |
| Example 5 | Dry ground | 3 | — | 20 | Spray Adhesion | — | 0.3 |
| Example 6 | Dry ground | 2 | — | 100 | Dry ground | 2000 rpm × 3 min | 30 |

TABLE 3-continued

| Sample | | | | | | | |
|---|---|---|---|---|---|---|---|
| Example 7 | Emulsifying dispersion | — | 12000 rpm × 10 min | 2 | Emulsifying dispersion | — | *1 |
| Example 8 | No Grinding | 0 | — | 350 | Dry ground | 500 rpm × 3 min | 110 |
| Example 9 | Emulsifying dispersion | — | 16000 rpm × 30 min | 0.8 | Emulsifying dispersion | — | *1 |
| Example 10 | Dry ground | 2 | — | 100 | Dry ground | 2000 rpm × 3 min | 30 |
| Example 11 | Dry ground | 2 | — | 100 | Dry ground | 2000 rpm × 3 min | 30 |
| Example 12 | Dry ground | 3 | — | 20 | Dry ground | 800 rpm × 3 min | 98 |
| Example 13 | Dry ground | 3 | — | 20 | Dry ground | 3000 rpm × 3 min | 10 |
| Example 14 | Dry ground | 3 | — | 20 | Dry ground | 3000 rpm × 3 min | 10 |
| Comparative example 1 | Dry ground | 2 | — | 100 | Dry ground | 2000 rpm × 3 min | 30 |
| Comparative example 2 | Dry ground | 2 | — | 100 | Dry ground | 2000 rpm × 3 min | 30 |

| | Preparation of molding | | | |
|---|---|---|---|---|
| Sample | Patter of die cutting (mm) × (mm) × (mm) | Number of pixels (width × breadth) | Thickness of square frame-shaped stainless steel spacer (mm) | Thickness of stainless steel plate (mm) | Size of molding (mm) × (mm) × (mm) |
| Example 1 | 10 × 10 × 15 | 20 × 20 | 20 | 10 | 10 × 10 × 10 |
| Example 2 | 20 × 20 × 25 | 10 × 10 | 40 | 20 | 20 × 20 × 20 |
| Example 3 | 10 × 10 × 15 | 20 × 20 | 20 | 10 | 10 × 10 × 10 |
| Example 4 | 1.0 × 1.0 × 15 | 200 × 200 | 10 | 10 | 1.0 × 1.0 × 1.2 |
| Example 5 | 10 × 10 × 15 | 20 × 20 | 20 | 10 | 10 × 10 × 10 |
| Example 6 | 10 × 10 × 15 | 20 × 20 | 20 | 10 | 10 × 10 × 10 |
| Example 7 | 10 × 10 × 15 | 20 × 20 | 20 | 10 | 10 × 10 × 10 |
| Example 8 | 10 × 10 × 15 | 20 × 20 | 20 | 10 | 10 × 10 × 10 |
| Example 9 | 10 × 10 × 15 | 20 × 20 | 20 | 10 | 10 × 10 × 10 |
| Example 10 | 10 × 10 × 15 | 20 × 20 | 20 | 10 | 10 × 10 × 10 |
| Example 11 | 10 × 10 × 15 | 20 × 20 | 20 | 10 | 10 × 10 × 10 |
| Example 12 | 10 × 10 × 15 | 20 × 20 | 20 | 10 | 10 × 10 × 10 |
| Example 13 | 1.0 × 1.0 × 15 | 200 × 200 | 10 | 10 | 1.0 × 1.0 × 1.0 |
| Example 14 | 5 × 5 × 15 | 40 × 40 | 20 | 15 | 5 × 5 × 5 |
| Comparative example 1 | 25 × 25 × 30 | 8 × 8 | 50 | 25 | 25 × 25 × 25 |
| Comparative example 2 | 0.8 × 0.8 × 5.0 | 250 × 250 | 5 | 10 | 0.8 × 0.7 × 0.8 |

*1: Additive of 0.1 μm or more was not observed. P was detected.

From above Tables, compared to Comparative Examples 1-7, it is proven that Examples 1-7 of this invention exhibited excellent dispersibility of the organic additive in the film, and deterioration of the cellulose ester resin was suppressed, because the retention ratio of the weight average molecular weight during formation of the heat melt film is high and thus the modulus of elasticity of the film is also excellent.

What is claimed is:

1. A method for manufacturing a polarizing plate protective film comprising the steps of:
   1) mixing a cellulose ester resin and an organic additive to obtain a mixing composition in a state of particles comprising the cellulose ester resin and the organic additive both having adjusted particle diameter,
   2) placing the mixing composition in a mold and compressing to obtain an integral molding, the integral molding having a size of 1 mm×1 mm×1 mm to 20 mm×20 mm×20 mm, and the cellulose ester resin is contained in the integral molding in a state of particles wherein a weight average particle diameter (cDw50) of the cellulose ester film resin is in the range of 1 to 200 μm, and
   3) melting the cellulose ester resin particles in the integral molding by heating the integral molding thereby to form the polarizing plate protective film.

2. The method for manufacturing the polarizing plate protective film of claim 1, wherein the organic additive in the integral molding is incorporated at a size of not more than 100 μm of a maximum dispersed particle diameter (eDmax), and a weight average particle diameter (cDw50) of the cellulose ester resin being in a state of particles and the maximum dispersed particle diameter (eDmax) having a relationship:

$$cDw50 > eDmax.$$

3. The method for manufacturing the polarizing plate protective film of claim 1, wherein a maximum dispersed particle diameter of the organic additive in the polarizing plate protective film is not greater than 0.1 μm.

4. The method for manufacturing the polarizing plate protective film of claim 1, wherein the cellulose ester resin has the following properties:

when 1 g of the cellulose ester resin is charged into 20 ml of pure water (at an electrical conductivity of not greater than 1 μs/cm and a pH of 6.8) and the resultant is stirred for 1 hour at 25° C. in a nitrogen environment, the resulting solution exhibits a pH of 6 to 7 and an electrical conductivity of 1 to 100 μs/cm.

5. The method for manufacturing the polarizing plate protective film of claim 1, wherein a volume specific resistance of the cellulose ester resin is 1011 to 1015 Ω/cm.

6. The method for manufacturing the polarizing plate protective film of claim 1, wherein a molecular weight retention ratio (Mwr (%)) is 85 to 100%, Mwr (%) being defined as (Mwf/Mwt)×100, provided that Mwt is a weight average molecular weight of the integral molding, and Mwf is a weight average molecular weight of the film obtained from the integral molding.

7. The method for manufacturing the polarizing plate protective film of claim 1, wherein a temperature at the time of melt extrusion is in a range of 150-250° C.

8. The method for manufacturing the polarizing plate protective film of claim 1, wherein the cellulose ester is cellulose acetate propionate or cellulose acetate butyrate, having an acyl group of 2-4 carbon atoms as a substituent group, and given that a substituent degree of the acetyl group is represented by X and a substituent degree of a propionyl group or a butyryl group is represented by Y, the cellulose resin includes cellulose esters which simultaneously satisfy both Equation (I) and Equation (II):

$$2.6 \leq X+Y \leq 3.0 \quad \text{Equation (I)}$$

$$0 \leq X \leq 2.5 \quad \text{Equation (II).}$$

9. The method for manufacturing the polarizing plate protective film of claim 8, wherein the cellulose ester is cellulose acetate propionate satisfying $1.9 \leq X \leq 2.5$ and $0.1 \leq Y \leq 0.9$.

* * * * *